US008238547B2

(12) United States Patent
Ohki et al.

(10) Patent No.: US 8,238,547 B2
(45) Date of Patent: Aug. 7, 2012

(54) SOUND PICKUP APPARATUS AND ECHO CANCELLATION PROCESSING METHOD

(75) Inventors: Kazuhiro Ohki, Tokyo (JP); Hiroyuki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1814 days.

(21) Appl. No.: 11/125,541

(22) Filed: May 9, 2005

(65) Prior Publication Data

US 2005/0254640 A1 Nov. 17, 2005

(30) Foreign Application Priority Data

May 11, 2004 (JP) ................................ P2004-141610

(51) Int. Cl.
*H04M 9/08* (2006.01)

(52) U.S. Cl. ................................ 379/406.1; 379/406.04

(58) Field of Classification Search ......... 379/406.01–406.16, 3; 370/282–292; 381/66, 93, 94.1–94.8; 455/570
See application file for complete search history.

(56) References Cited

U.S. PATENT DOCUMENTS

| | | | | |
|---|---|---|---|---|
| 5,386,465 | A * | 1/1995 | Addeo et al. | 379/202.01 |
| 5,625,697 | A * | 4/1997 | Bowen et al. | 381/92 |
| 6,580,794 | B1 * | 6/2003 | Ono | 379/406.08 |
| 2002/0039414 | A1 | 4/2002 | Nakai et al. | |
| 2003/0059061 | A1 | 3/2003 | Tsuji et al. | |
| 2003/0105540 | A1 * | 6/2003 | Debail | 700/94 |
| 2005/0094795 | A1 * | 5/2005 | Rambo | 379/202.01 |

FOREIGN PATENT DOCUMENTS

| | | |
|---|---|---|
| EP | 0 627 825 | 12/1994 |
| EP | 0 742 679 | 11/1996 |
| JP | 1 24668 | 1/1989 |
| JP | 1 29096 | 1/1989 |
| WO | WO 99 41848 | 8/1999 |

* cited by examiner

*Primary Examiner* — Md S Elahee
*Assistant Examiner* — Akelaw Teshale
(74) *Attorney, Agent, or Firm* — Frommer Lawrence & Haug LLP; William S. Frommer; Thomas F. Presson

(57) ABSTRACT

A sound pickup apparatus selecting one of a plurality of microphones and performing echo cancellation processing for a plurality of microphones with an echo canceller to output a sound. The sound pickup apparatus sets a "learning mode" when the power supply is turned on, outputs a calibration sound from an echo cancellation calibration sound generator via a speaker, detects an echo at that time with a microphone and obtains an echo cancellation use parameter canceling the echo.

10 Claims, 23 Drawing Sheets

WHEN SOUND SOURCE IS IN FRONT OF MICROPHONE

WHEN SOUND SOURCE IS IN THE DIRECTION OF 60 DEGREES FROM THE FRONT OF MICROPHONE

WHEN SOUND SOURCE IS IN THE DIRECTION OF 120 DEGREES FROM THE FRONT OF MICROPHONE

WHEN SOUND SOURCE IS IN THE DIRECTION OF 180 DEGREES FROM THE FRONT OF MICROPHONE

FIG. 9

INITIAL OPERATION
(1) MEASUREMENT OF SURROUNDING NOISE (FLOOR NOISE)
(2) SETTING OF CHAIRPERSON
(3) SENSITIVITY DIFFERENCE ADJUSTMENT

NORMAL OPERATION
(1) SELECT AND SWITCH PROCESSING OF MICROPHONE
(2) DISPLAY PROCESSING OF SELECTED MICROPHONE
(3) DECISION OF IMAGING CONDITION (THIRD EMBODIMENT)
(4) BASIC PROCESSING
- A, BAND SEPARATION OF SOUND PICKUP SIGNALS OF MICROPHONES AND LEVEL CONVERSION PROCESSING
- B, PROCESSING FOR JUDGMENT OF START AND END OF SPEECH
- C, PROCESSING FOR DETECTION OF MICROPHONE IN DIRECTION OF SPEAKING PERSON
- D, PROCESSING FOR JUDGMENT OF TIMING OF SWITCHING OF MICROPHONE IN DIRECTION OF SPEAKING PERSON
- E, MEASUREMENT OF FLOOR NOISE IN NORMAL STATE

BASIC VIEW OF SPEECH START/END JUDGMENT

SELECTION SWITCH PROCESSING OF MICROPHONE SIGNAL

SOUND PICKUP APPARATUS AND ECHO CANCELLATION PROCESSING METHOD

CROSS REFERENCES TO RELATED APPLICATIONS

The present invention contains subject matter related to Japanese Patent Application JP 2004-141610 filed in the Japanese Patent Office on May 11, 2004, the entire contents of which being incorporated herein by reference.

BACKGROUND OF THE INVENTION

1. Field of the Invention

The present invention relates to a sound pickup apparatus and an echo cancellation processing method preferable for use when, for example, a plurality of conference participants in two distant conference rooms hold an audio teleconference by using a plurality of microphones, and, preferably, hold a voice+television conference by adding a video.

In particular, the present invention relates to a sound pickup apparatus and an echo cancellation processing method that an echo cancellation use calibration sound is applied before use of the sound pickup apparatus, an echo cancellation use parameter is learned and generated by an echo canceller because the echo canceller does not have an adequate echo cancellation use parameter in an initial state.

2. Description of the Related Art

A TV conference system having a sound pickup apparatus or a sound pickup apparatus that a picture image is added has been used to enable conference participants in two conference rooms at distant location to hold a conference.

In a sound pickup apparatus, a microphone is selected, where the microphone is used by a speaking person whose voice should be transmitted to a conference room of the other party among the speaking persons using a plurality of microphones.

An echo canceller is placed in such a sound pickup apparatus, and the echo canceller prevents becoming hard to hear due to transmit of an echo of a sending side to a sound receiving side.

The echo canceller performs the echo cancellation processing with performing learning processing for a sound from the selected microphone among a plurality of microphones with using an echo cancellation use parameter (learning data). Therefore, in the echo canceller, an echo cancellation use parameter of each microphone is held.

SUMMARY OF THE INVENTION

A sound pickup apparatus may be fixed in one place to be used, and one sound pickup apparatus may be placed in various places to be used.

A condition that an echo is generated depends on an arrangement condition of a sound pickup apparatus strongly. For example, an environment that the echo does not matter so much, such as a large room may be considered, and an environment that a resonance is strong and the echo greatly influences may be considered.

Although a plurality of, for example, six microphones are mounted on the sound pickup apparatus, an influence of the echo for each microphone may vary when an arrangement of a plurality of microphones varies.

Soon after the sound pickup apparatus is arranged, as mentioned above, an echo condition is not clear, therefore, an adequate echo cancellation use parameter is not set for each microphone. When using the sound pickup apparatus in such a state, as a result of performing unnatural echo cancellation processing, an unnatural echo cancellation processing result is sent to a receiving side, and a disadvantage that it is hard to hear it in the other party may be occurred.

An echo canceller performs learning processing and updates an echo cancellation use parameter and such a state can be improved, however, it takes time.

As mentioned above, it suffers from a disadvantage arising from inadequacy of an echo cancellation use parameter in an initial state of the sound pickup apparatus.

It is desirable to provide a sound pickup apparatus enabling to use the sound pickup apparatus after learning and generating an adequate echo cancellation use parameter in an initial state in the sound pickup apparatus performing echo cancellation processing.

Further, it is desirable to provide an echo cancellation processing method applied to the sound pickup apparatus.

According to a first aspect of the present invention, there is provided a sound pickup apparatus having a plurality of microphones arranged based on a predetermined arrangement condition, a microphone selection section for selecting one or more of a plurality of the microphones, an echo cancellation processing section for performing echo cancellation processing for every microphone for a sound signal detected by the selected microphone, an echo cancellation calibration sound generation section, a speaker outputting a calibration sound from the echo cancellation calibration sound generation section, and an echo cancellation processing control section for driving the echo cancellation calibration sound generation section to generate an echo cancellation calibration sound and to output it from the speaker and selecting one or more microphones detecting sounds including the echo cancellation calibration sound outputted from the speaker via the microphone selection section in a learning mode of the echo cancellation processing section, and updating or generating an echo cancellation use parameter by learning for the selected microphone in the echo cancellation processing section.

According to a second aspect of the present invention, there is provided an echo cancellation processing method having the steps of generating an echo cancellation calibration sound via a speaker and detecting sounds including the calibration sound with a microphone in a learning mode of echo cancellation processing, performing echo cancellation processing for a detected sound signal of the microphone to generate or update an echo cancellation use parameter for the microphone, and performing the echo cancellation processing by using the obtained echo cancellation use parameter after the learning mode.

According to the present invention, in an initial state of a sound pickup apparatus or an initial state of an echo cancellation processing method, since an echo cancellation use parameter in an echo cancellation processing section is learned and generated for every microphone by using an echo cancellation use calibration sound forcibly, after that, a sound pickup apparatus can be used by using an echo cancellation use parameter obtained adequately for each microphone. As a result, an adequate echo cancellation processing result can be obtained for each microphone immediately after normal use of the sound pickup apparatus.

BRIEF DESCRIPTION OF THE DRAWINGS

These and other features of the present invention will become clearer from the following description of the preferred embodiments given with reference to the accompanying drawings, in which:

FIG. 9 is a graph schematically showing the overall content of processing in the first digital signal processor (DSP1);

DESCRIPTION OF THE PREFERRED EMBODIMENTS

Preferred embodiments of the present invention will be described with reference to the accompanying drawings.

Hereinafter, a sound pickup apparatus and an echo cancellation processing method of an embodiment of the present invention will be explained.

First Embodiment

Figure 1A:
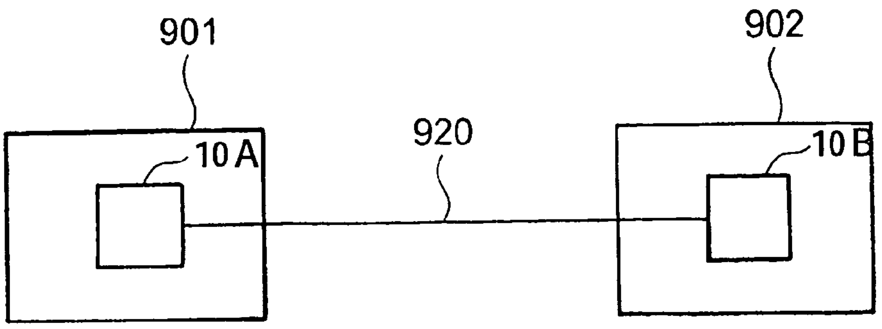
FIG. 1A is a view schematically showing a conference system as an example to which a sound pickup apparatus of the present invention is applied.
Figure 1B:
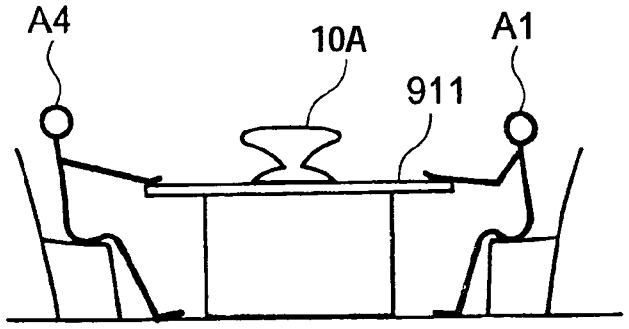
FIG. 1B is a view of a state where the sound pickup apparatus in FIG. 1A is placed.
Figure 1C:
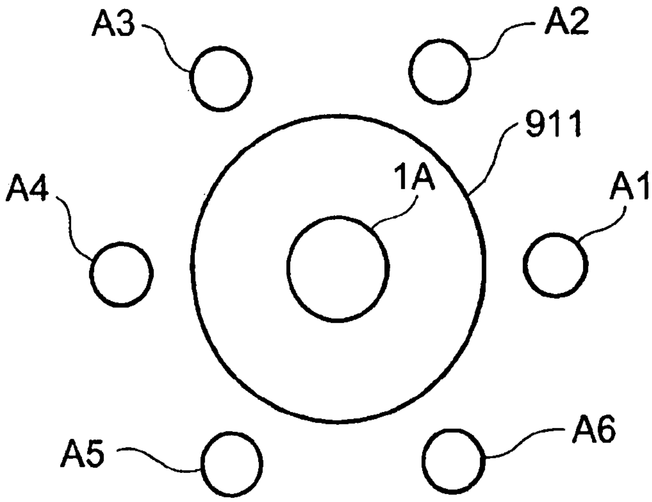
FIG. 1C is a view of an arrangement of the sound pickup apparatus placed on a table and conference participants.

FIGS. 1A to 1C are views of the configuration showing an example to which the sound pickup apparatus of the embodiment of the present invention is applied.

As illustrated in FIG. 1A, sound pickup apparatus 10A and 10B are disposed in two conference rooms 901 and 902. These sound pickup apparatuses 10A and 10B are connected by a communication line 920, for example, a telephone line.

[Brief of Sound Pickup Apparatus]

Usually, a conversation via the communication line 920 is carried out between one speaker and another, that is, one-to-one, but in the communication apparatus of the embodiment of the present invention, a plurality of conference participants in the conference rooms 901 and 902 can converse with each other by using one communication line 920. Note that in the present embodiment, in order to avoid congestion of audio, the parties speaking at the same time (same period) are limited to one at each side.

As mentioned above, the sound pickup apparatus selects (identifies) a calling party and picks up audio of selected calling party.

The picked-up audio and the imaged video are transferred (sent) to the conference room of the other side and played in the sound pickup apparatus of the other side.

<Details of Communication Apparatus>

The configuration of the communication apparatus in the sound pickup apparatus according to an embodiment of the present invention will be explained referring to FIG. 2 to FIG. 4. The first sound pickup apparatus 10A and the second sound pickup apparatus 10B have the same configuration.

Figure 2:
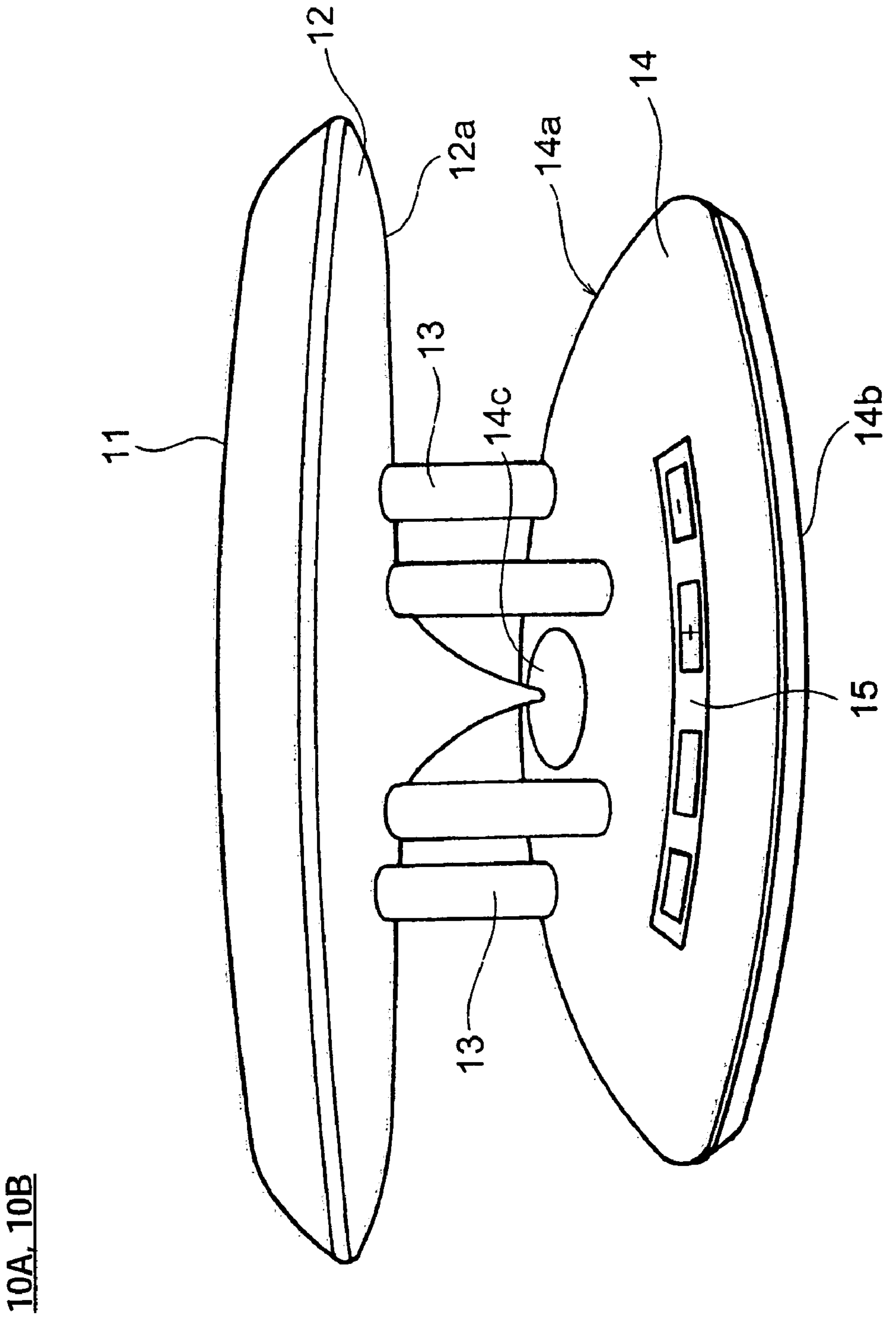
FIG. 2 is a perspective view of the sound pickup apparatus of an embodiment of the present invention.

FIG. 2 is a perspective view of the sound pickup apparatus according to an embodiment of the present invention.

Figure 3:
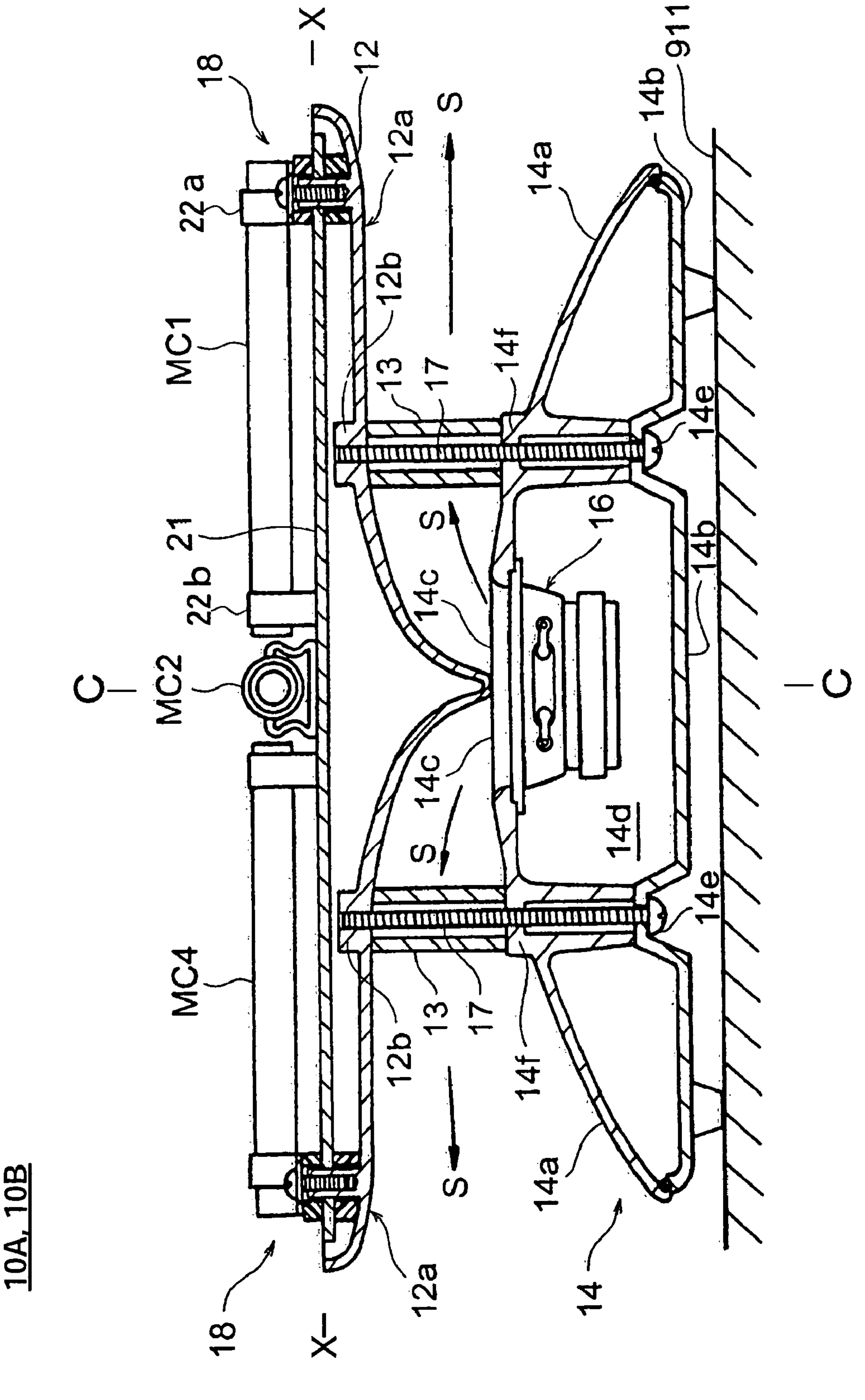
FIG. 3 is a sectional view of the inside of the sound pickup apparatus illustrated in FIG. 2.

FIG. 3 is a sectional view of the sound pickup apparatus illustrated in FIG. 2.

Figure 4:
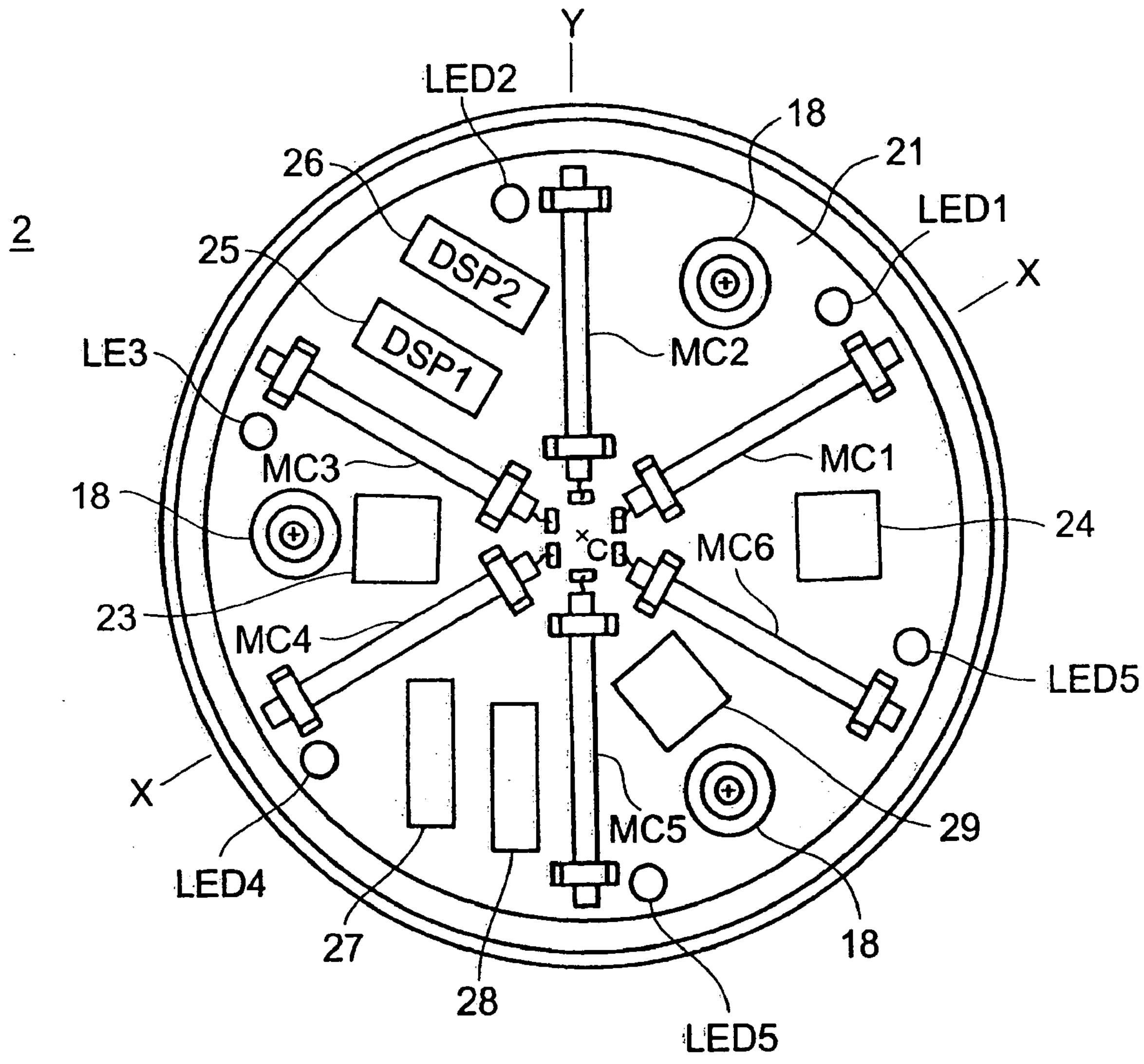
FIG. 4 is a plan view of a microphone electronic circuit housing with the upper cover detached in the sound pickup apparatus illustrated in FIG. 3.

FIG. 4 is a plan view of a microphone electronic circuit housing of the sound pickup apparatus illustrated in FIGS. 2 and 3 and a plan view along a line X-X of FIG. 3.

As illustrated in FIG. 2, the sound pickup apparatus has an upper cover 11, a sound reflection plate (a sound orientation plate or a sound guidance plate) 12, a coupling member 13, a speaker housing 14, and an operation unit 15.

As illustrated in FIG. 3, the speaker housing 14 has a sound reflection surface (a sound orientation plate or a sound guidance plate) 14*a*, a bottom surface 14*b*, and an upper sound output opening 14*c*. A receiving and reproduction speaker 16 is housed in a space surrounded by the sound reflection surface 14*a* and the bottom surface 14*b*, that is, an inner cavity 14*d*. The sound reflection plate 12 is located above the speaker housing 14. The speaker housing 14 and the sound reflection plate 12 are connected by the coupling member 13.

A restraint member 17 passes through the coupling member 13. The restraint member 17 restrains the space between a restraint member bottom fixing portion 14*e* of the bottom surface 14*b* of the speaker housing 14 and a restraint member fixing portion 12*b* of the sound reflection plate 12. Note that the restraint member 17 only passes through a restraint member passage 14*f* of the speaker housing 14. The reason why the restraint member 17 passes through the restraint member passage 14*f* and does not restrain it is that the speaker housing 14 vibrates by the operation of the speaker 16 and that the vibration thereof is not restricted around the upper sound output opening 14*c*.

Speech by a speaking person of the other conference room passes through the receiving and reproduction speaker 16 and upper sound output opening 14*c* and is diffused along the space defined by the sound reflection surface 12*a* of the sound reflection plate 12 and the sound reflection surface 14*a* of the speaker housing 14 to the entire 360 degree orientation around an axis C-C.

As illustrated, the cross-section of the sound reflection surface 12*a* of the sound reflection plate 12 draws a loose trumpet type arc a conical sectional portion of the center portion and an almost smooth plane lengthened the surroundings edge of the center portion are consecutive. The cross-section of the sound reflection surface 12*a* forms the illustrated sectional shape over 360 degrees (entire orientation) around the axis C-C.

Similarly, the cross-section of the sound reflection surface 14*a* of the speaker housing 14 draws a loose convex shape as illustrated. The cross-section of the sound reflection surface 14*a* forms the illustrated sectional shape over 360 degrees (entire orientation) around the axis C-C.

The sound S outputted from the receiving and reproduction speaker 16 passes through the upper sound output opening 14*c*, passes through the sound output space defined by the sound reflection surface 12*a* and the sound reflection surface 14*a* and having a trumpet-like cross-section, is diffused along the surface of the table 911 on which the sound pickup apparatus is placed in the entire orientation of 360 degrees around the axis C-C, and is heard with an equal volume by all conference participants A1 to A6. In the present embodiment, the surface of the table 911 is utilized as part of the sound propagating means.

As mentioned above, the sound reflection surface 12*a* and the sound reflection surface 14*a* operate together and function as a sound orientation plate orientating the sound S outputted from the receiving and reproduction speaker 16 to the entire orientation of 360 degrees, a sound guidance plate guiding the sound, or a sound diffusion unit.

The state of diffusion of the sound S outputted from the receiving and reproduction speaker 16 is shown by the arrows.

The sound reflection plate 12 supports a printed circuit board 21.

The printed circuit board 21, as illustrated in a plane in FIG. 4, mounts the microphones MC1 to MC6 of the microphone electronic circuit housing 2, light emitting diodes LEDs 1 to 6, a microprocessor 23, a codec 24, a first digital signal processor (DSP) 25 performing various types of signal processing and control processing of the sound pickup apparatus, a second digital signal processor (DSP) 26 performing echo cancellation processing, an A/D converter block 27, a D/A converter block 28, an amplifier block 29, and other various types of electronic circuits. The sound reflection plate 12 also functions as a member for supporting the microphone electronic circuit housing 2.

The printed circuit board 21 has dampers 18 attached to it for absorbing vibration from the receiving and reproduction speaker 16 so as to prevent vibration from the receiving and reproduction speaker 16 from being transmitted through the sound reflection plate 12, entering the microphones MC1 to MC6 etc., and becoming noise. Each damper 18 is comprised by a screw and a buffer material such as a vibration-absorbing rubber insert between the screw and the printed circuit board 21. The buffer material is fastened by the screw to the printed circuit board 21. Namely, the vibration transmitted from the receiving and reproduction speaker 16 to the printed circuit board 21 is absorbed by the buffer material. Due to this, the microphones MC1 to MC6 are not affected much by sound from the speaker 16.

<Arrangement of Microphones>

As illustrated in FIG. 4, six microphones MC1 to MC6 are located radially at equal angles and equal intervals (at intervals of 60 degrees) from the center axis C of the printed circuit board 21. Each microphone is a microphone having single directivity. The characteristic thereof will be explained later.

Each of the microphones MC1 to MC6 is supported by a first microphone support member 22*a* and a second microphone support member 22*b* both having flexibility or resiliency so that it can freely rock (illustration is made for only the first microphone support member 22*a* and the second microphone support member 22*b* of the microphone MC1 for simplifying the illustration). In addition to the measure of preventing the influence of vibration from the receiving and reproduction speaker 16 by the dampers 18 using the above buffer materials, by preventing the influence of vibration from the receiving and reproduction speaker 16 by absorbing the vibration of the printed circuit board 21 vibrating by the vibration from the receiving and reproduction speaker 16 by the first and second microphone support members 22*a* and 22*b* having flexibility or resiliency, noise of the receiving and reproduction speaker 16 is avoided.

As illustrated in FIG. 3, the receiving and reproduction speaker 16 is oriented vertically with respect to the center axis C-C of the plane in which the microphones MC1 to MC6 are located (oriented (directed) upward in the present embodiment). By such an arrangement of the receiving and reproduction speaker 16 and the six microphones MC1 to MC6, the distances between the receiving and reproduction speaker 16 and the microphones MC1 to MC6 become equal and the audio from the receiving and reproduction speaker 16 arrives at the microphones MC1 to MC6 with almost the same volume and same phase. However, due to the configuration of the sound reflection surface 12*a* of the sound reflection plate 12 and the sound reflection surface 14*a* of the speaker housing 14, the sound of the receiving and reproduction speaker 16 is prevented from being directly input to the microphones MC1 to MC6. In addition, as explained above, by using the dampers 18 using the buffer materials, the first microphone support member 22*a* and the second microphone support member 22*b* having flexibility or resiliency, the influence of the vibration of the receiving and reproduction speaker 16 is reduced.

The conference participants A1 to A6, as illustrated in FIG. 1C, are usually positioned at almost equal intervals in the 360 degree direction of the communication apparatus in the vicinity of the microphones MC1 to MC6 arranged at intervals of 60 degrees.

As a means for notification of the determination of the speaking person (microphone selection result displaying means), light emission diodes LED1 to LED6 are arranged in the vicinity of the microphones MC1 to MC6. The light emission diodes LED1 to LED6 have to be provided so as to be able be viewed from all conference participants A1 to A6 even in a state where the upper cover 11 is attached. Accordingly, the upper cover 11 is provided with a transparent window so that the light emission states of the light emission diodes LED1 to LED6 can be viewed. Naturally, openings can also be provided at the portions of the light emission diodes LED1 to LED6 in the upper cover 11, but the transparent window is preferred from the viewpoint for preventing dust from entering the microphone electronic circuit housing 2.

In order to perform the various types of signal processing explained later, the printed circuit board 21 is provided with a first digital processor (DSP1) 25, a second digital signal processor (DSP2) 26, and various types of electronic circuits 27 to 29 are arranged in a space other than the portion where the microphones MC1 to MC6 are located.

In the present embodiment, the DSP 25 is used as the signal processing means for performing processing such as filter processing and microphone selection processing together with the various types of electronic circuits 27 to 29, and the DSP 26 is used as an echo canceller.

Figure 5:
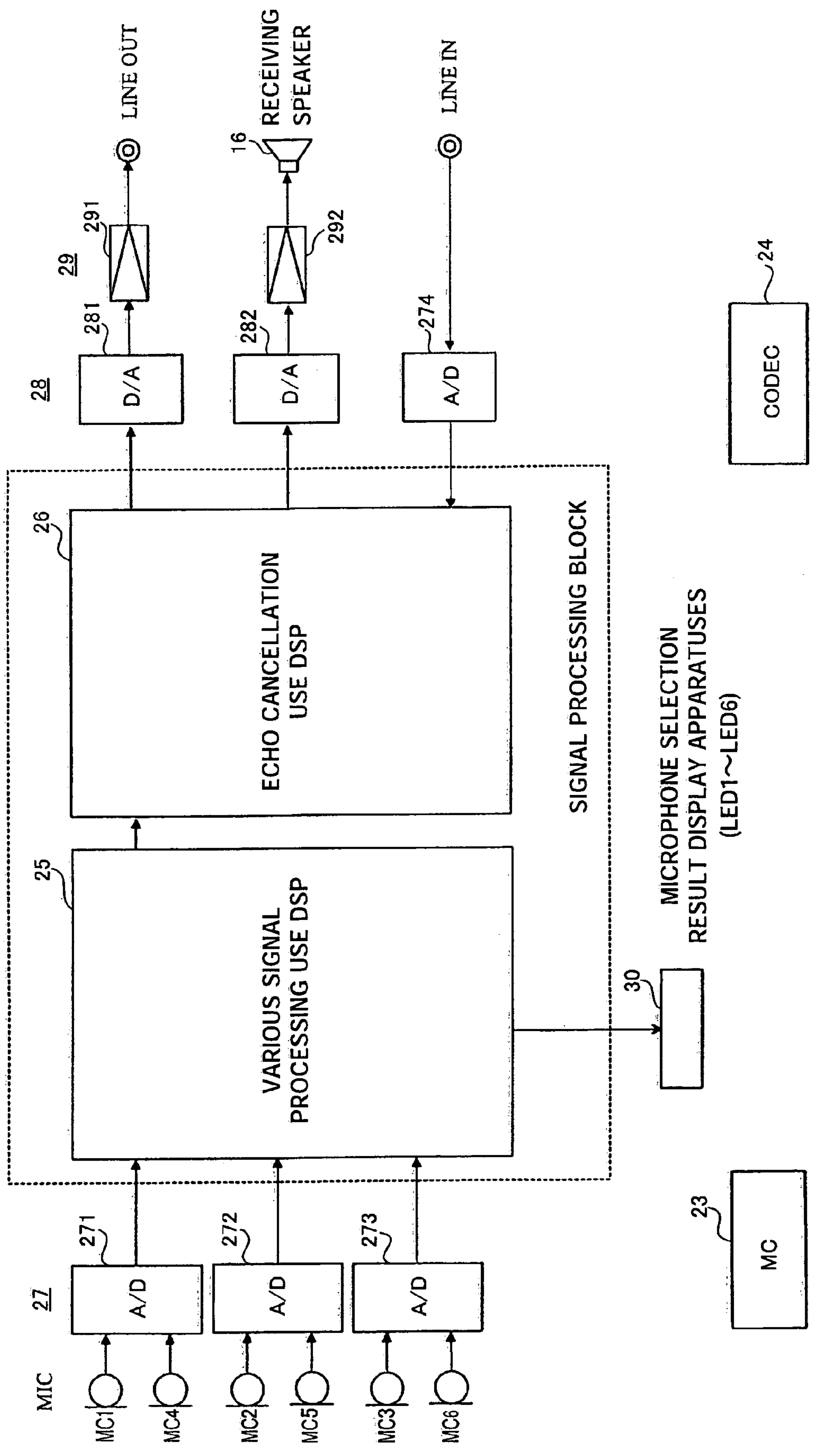
FIG. 5 is a view of a connection configuration of principal circuits of the microphone electronic circuit housing of a first embodiment and shows the connection configuration of a first digital signal processor (DSP1) and a second digital signal processor (DSP2)

FIG. 5 is a view of the schematic configuration of a microprocessor 23, a codec 24, the DSP 25, the DSP 26, an A/D converter block 27, a D/A converter block 28, an amplifier block 29, and other various types of electronic circuits.

The microprocessor 23 performs the processing for overall control of the microphone electronic circuit housing 2.

The codec 24 compresses and encodes the audio to be transmitted to the conference room of the other party.

The DSP 25 performs the various types of signal processing explained below, for example, the filter processing and the microphone selection processing.

The DSP 26 functions as the echo canceller.

In FIG. 5, as an example of the A/D converter block 27, four A/D converters 271 to 274 are exemplified, as an example of the D/A converter block 28, two D/A converters 281 and 282 are exemplified, and as an example of the amplifier block 29, two amplifiers 291 and 292 are exemplified.

In addition, as the microphone electronic circuit housing 2, various types of circuits such as the power supply circuit are mounted on the printed circuit board 21.

In FIG. 4, pairs of microphones MC1-MC4, MC2-MC5, and MC3-MC6 each arranged on a straight line at positions symmetric (or opposite) with respect to the center axis C of the printed circuit board 21 input two channels of analog signals to the A/D converters 271 to 273 for converting analog signals to digital signals. In the present embodiment, one A/D converter converts two channels of analog input signals to digital signals. Therefore, detection signals of two (a pair of) microphones located on a straight line straddling the center axis C, for example, the microphones MC1 and MC4, are input to one A/D converter and converted to the digital signals. Further, in the present embodiment, in order to identify the speaking person of the audio transmitted to the conference room of the other party, the difference of audio of two microphones located on one straight line, the magnitude of the audio and so on are referred to. Therefore, when signals of two microphones located on a straight line are input to the same A/D converter, the conversion timings become almost the same. There are therefore the advantages that the timing error is small when finding the difference of audio outputs of the two microphones, the signal processing becomes easy and so on.

Note that, the A/D converters 271 to 274 can be configured as A/D converters 271 to 274 equipped with variable gain type amplification functions as well.

Sound pickup signals of the microphones MC1 to MC6 converted at the A/D converters 271 to 273 are input to the DSP 25 where various types of signal processing explained later are carried out.

As one of processing results of the DSP 25, the result of selection of one of the microphones MC1 to MC6 is output to the light emission diodes LED1 to LED6 as one of the examples of the microphone selection result displaying means.

The processing result of the DSP 25 is output to the DSP 26 where the echo cancellation processing is carried out. The DSP 26 has for example an echo cancellation transmitter and an echo cancellation receiver.

The processing results of the DSP 26 are converted to analog signals at the D/A converters 281 and 282. The output from the D/A converter 281 is encoded at the codec 24 according to need, output to a line-out terminal of the telephone line 920 (FIG. 1A) via the amplifier 291, and output as sound via the receiving and reproduction speaker 16 of the communication apparatus disposed in the conference room of the other party.

The audio from the communication apparatus disposed in the conference room of the other party is input via the line-in terminal of the telephone line 920 (FIG. 1A), converted to a digital signal at the A/D converter 274, and input to the DSP 26 where it is used for the echo cancellation processing. Further, the audio from the communication apparatus disposed in the conference room of the other party is applied to the speaker 16 by a not illustrated route and output as sound.

The output from the D/A converter 282 is output as sound from the receiving and reproduction speaker 16 of the communication apparatus via the amplifier 292. Namely, the conference participants A1 to A6 can also hear audio emitted by the speaking parties in the conference room via the receiving and reproduction speaker 16 in addition to the audio of the selected speaking person of the conference room of the other party from the receiving and reproduction speaker 16 explained above.

<Microphones MC1 to MC6>

Figure 6:
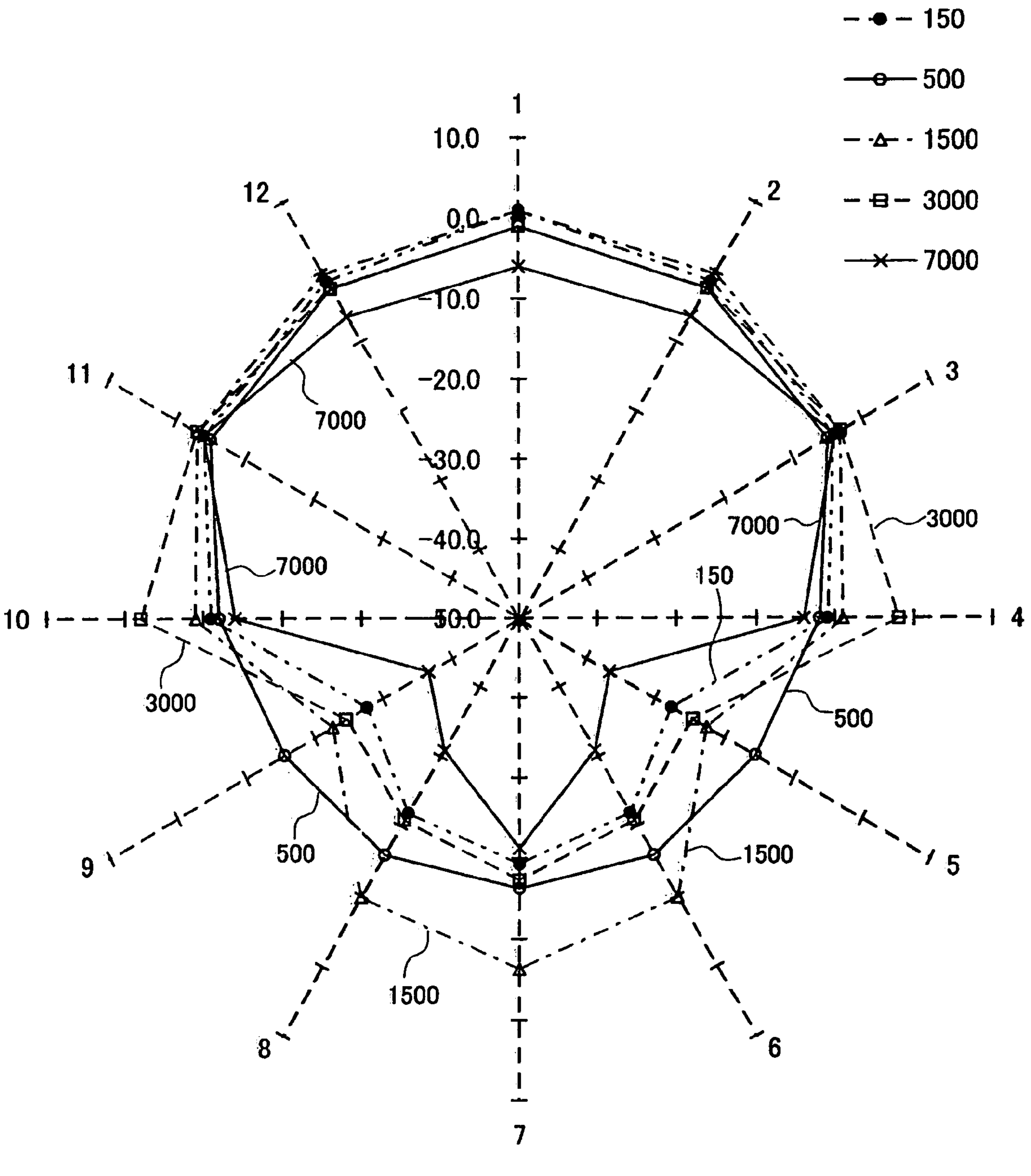
FIG. 6 is a view of the characteristic of the microphones illustrated in FIG. 4.
Figure 7A:
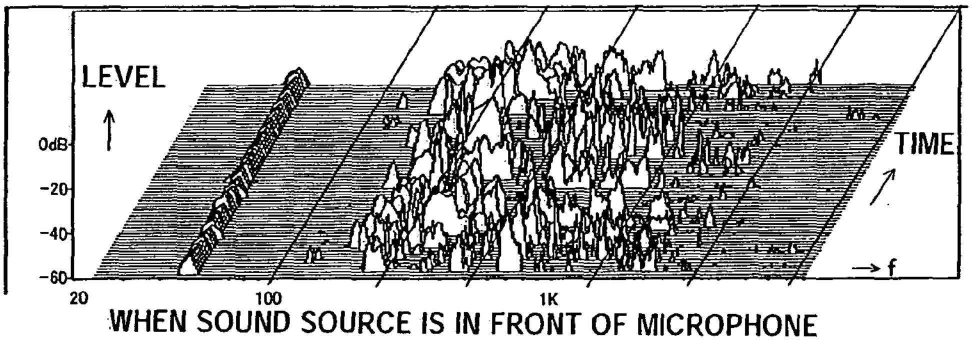
FIGS. 7A to 7D are graphs showing results of analysis of the directivities of microphones having the characteristic illustrated in FIG. 6.
Figure 7B:
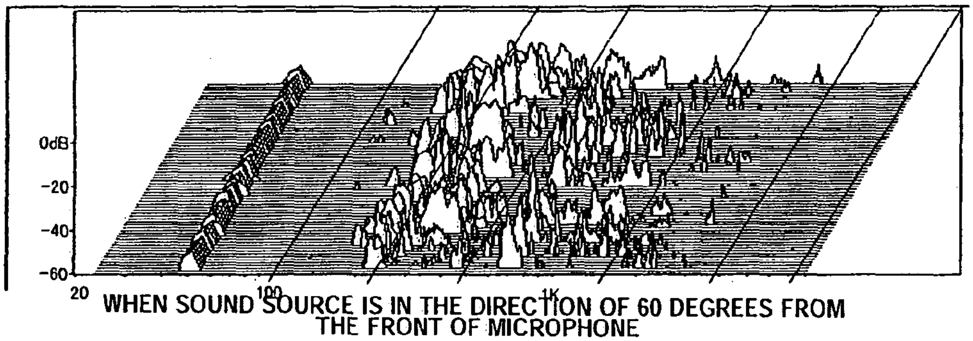
Figure 7C:
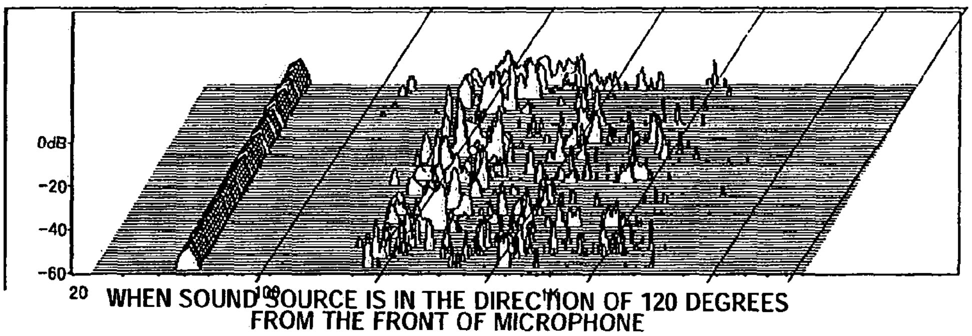
Figure 7D:
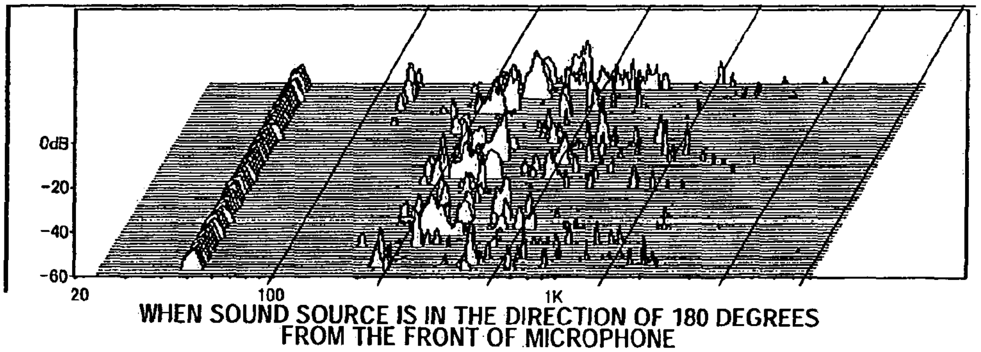

FIG. 6 is a graph showing directivities of the microphones MC1 to MC6.

In each single directivity characteristic microphone, as illustrated in FIG. 6, the frequency characteristic and the level characteristic differ according to the angle of arrival of the audio at the microphone from the speaking person. The plurality of curves indicate directivities when frequencies of the sound pickup signals are 100 Hz, 150 Hz, 200 Hz, 300 Hz, 400 Hz, 500 Hz, 700 Hz, 1000 Hz, 1500 Hz, 2000 Hz, 3000 Hz, 4000 Hz, 5000 Hz, and 7000 Hz. Note that for simplifying the illustration, FIG. 6 illustrates the directivity for 150 Hz, 500 Hz, 1500 Hz, 3000 Hz, and 7000 Hz as representative examples.

FIGS. 7A to 7D are graphs showing analysis results for the position of the sound source and the sound pickup levels of the microphones and, as an example of the analysis, show results obtained by positioning the speaker a predetermined distance from the communication apparatus, for example, a distance of 1.5 meters, and applying fast Fourier transforms (FFT) to the audio picked up by the microphones at constant time intervals. The X-axis represents the frequency, the Y-axis represents the signal level, and the Z-axis represents the time.

When using microphones having directivity shown in FIG. 6, a strong directivity is shown at the front surfaces of the microphones. In the present embodiment, by making good use of such a characteristic, the DSP 25 performs the selection processing of the microphones.

When not having microphones having directivity as in the embodiment of the present invention, but using microphones having no directivity, all sounds around the microphones are picked up, therefore the S/N's of the audio of the speaking person with the surrounding noise are mixed, so a good sound can not be picked up so much. In order to avoid this, in the present invention, by picking up the sounds by one directivity microphones, the S/N with the surrounding noise is enhanced.

Further, as the method for obtaining the directivity of the microphones, a microphone array using a plurality of no directivity microphones can be used. With this method, however, complex processing is necessary to match the time axes (phases) of the plurality of signals, therefore a long time is taken, the response is low, and the hardware configuration becomes complex. Namely, complex signal processing is necessary also for the signal processing system of the DSP. The present invention solves such a problem by using microphones having directivity exemplified in FIG. 6.

Further, to combine microphone array signals to utilize microphones as directivity sound pickup microphones, there is the disadvantage that the outer shape is restricted by the pass frequency characteristic and the outer shape becomes large. The present invention also solves this problem.

The sound pickup apparatus having the above configuration has the following advantages.

(1) The positional relationships between the even number of microphones MC1 to MC6 arranged at equal angles radially and at equal intervals and the receiving and reproduction speaker 16 are constant and further the distances thereof are very close, therefore the level of the sound issued from the receiving and reproduction speaker 16 directly coming back is overwhelmingly larger and dominant than the level of the sound issued from the receiving and reproduction speaker 16 passing through the conference room (room) environment and coming back to the microphones MC1 to MC6. Due to this, the characteristic (signal levels (intensities), frequency characteristic (f characteristic), and phases) of arrival of the sounds from the speaker 16 to the microphones MC1 to MC6 are constantly the same. That is, the sound pickup apparatus in the embodiment of the present invention has the advantage that the transmission function is constantly the same.

(2) Therefore, there is the advantage that the transmission function when switching the output of the microphone transmitted to the conference room of the other party when the speaking person changes does not change and it is not necessary to adjust the gain of the microphone system whenever the microphone is switched. In other words, there is the advantage that it is not necessary to re-do the adjustment once adjustment is carried out at the time of manufacture of the communication apparatus.

(3) Even if switching the microphone when the speaking person changes for the same reason as above, a single echo canceller (DSP) 26 is sufficient. A DSP is expensive. Further, it is not necessary to arrange a plurality of DSPs on a printed circuit board 21 having little empty space because various members are mounted on it. In addition, the space for arranging the DSP on the printed circuit board 21 may be small. As a result, the printed circuit board 21 and, in turn, the communication apparatus of the present invention can be made small.

(4) As explained above, since the transmission functions between the receiving and reproduction speaker 16 and the microphones MC1 to MC6 are constant, there is the advantage for example that adjustment of the sensitivity difference of the microphones of ±3 dB can be carried out solely by the microphone unit of the sound pickup apparatus. Details of the adjustment of the sensitivity difference will be explained later.

(5) By using a round table or a polygonal table as the table on which the sound pickup apparatus is mounted, a speaker system for equally dispersing (scattering) audio having an equal quality in the entire orientation of 360 degrees about the axis C by one receiving and reproduction speaker 16 in the communication apparatus 1 becomes possible.

(6) There is the advantage that the sound output from the receiving and reproduction speaker 16 is propagated through the table surface of the round table (boundary effect) and good quality sound effectively arrives at the conference participants equally and with a good efficiency, the sound and the phase of opposite side are cancelled in a ceiling direction of the conference room and become small, there is a little reflected sound from the ceiling direction at the conference participants, and as a result a clear sound is distributed to the participants.

(7) The sound output from the receiving and reproduction speaker 16 arrives at the microphones MC1 to MC6 arranged at equal angles radially and at equal intervals with the same volume simultaneously, therefore a decision of whether sound is audio of a speaking person or received audio becomes easy. As a result, erroneous decision in the microphone selection processing is reduced. Details thereof will be explained later.

(8) By arranging an even number of, for example, six, microphones at equal angles radially and at equal intervals so that a facing pair of microphones are arranged on a straight line, the level comparison for detecting the direction can be easily carried out.

(9) By the dampers 18, the microphone support members 22 and so on, the influence of vibration due to the sound of the receiving and reproduction speaker 16 exerted upon the sound pickup of the microphones MC1 to MC6 can be reduced.

(10) As illustrated in FIG. 3, structurally, the sound of the receiving and reproduction speaker 16 does not propagate directly to the microphones MC1 to MC6. Accordingly, in the sound pickup apparatus, there is little influence of the noise from the receiving and reproduction speaker 16.

<Modification Example>

Figure 8:
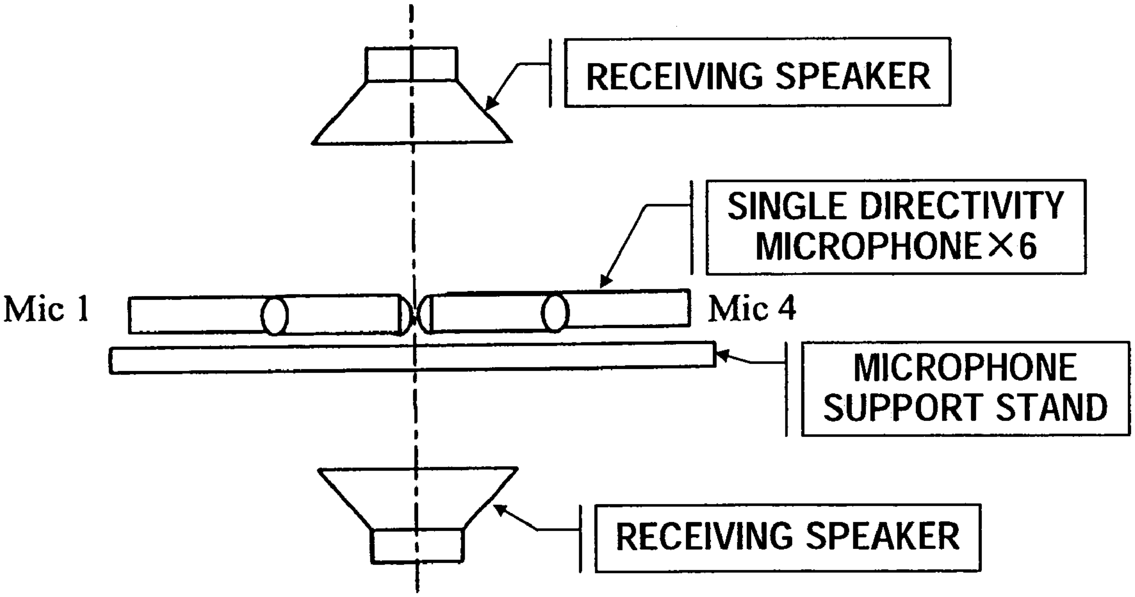
FIG. 8 is a view of the partial configuration of a modification of the sound pickup apparatus of the present invention.

In the sound pickup apparatus explained referring to FIG. 2 to FIG. 3, the receiving and reproduction speaker 16 was arranged at the lower portion, and the microphones MC1 to MC6 (and related electronic circuits) were arranged at the upper portion, but it is also possible to vertically invert the positions of the receiving and reproduction speaker 16 and the microphones MC1 to MC6 (and related electronic circuits) as illustrated in FIG. 8. Even in such a case, the above effects are exhibited.

The number of microphones is not limited to six. Either number of microphones, for example, four or eight, may be arranged at equal angles radially and at equal intervals about the axis C so that a plurality of pairs are located on straight lines (in the same direction), for example, like the microphones MC1 and MC4. The reason that two microphones, for example MC1 and MC4, are arranged on a straight line facing each other as a preferable embodiment is for selecting the microphone and identifying the speaking person.

<Content of Signal Processing>

Hereinafter, the content of the processing performed mainly by the first digital signal processor (DSP) 25 will be explained.

FIG. 9 is a view schematically illustrating the processing in the sound pickup apparatus 10A performed by the DSP 25. Hereinafter, a brief explanation will be given.

(1) Measurement of Surrounding Noise

As an initial operation, preferably, the noise of the surroundings where the sound pickup apparatus is disposed is measured.

The sound pickup apparatus can be used in various environments (conference rooms). In order to achieve correct selection of the microphone and raise the performance of the sound pickup apparatus, in the present invention, at the initial stage, the noise of the surrounding environment where the sound pickup apparatus is disposed is measured to enable elimination of the influence of that noise from the signals picked up at the microphones.

Naturally, when the sound pickup apparatus is repeatedly used in the same conference room, the noise is measured in advance, so this processing can be omitted when the state of the noise does not change. Note that the noise can also be measured in the normal state.

(2) Selection of Chairperson

For example, when using the sound pickup apparatus for a two-way conference, it is advantageous if there is a chairperson who runs the proceedings in the conference rooms. Accordingly, as an aspect of the present invention, in the initial stage using the sound pickup apparatus, the chair is set from the operation unit 15 of the sound pickup apparatus. As a method for setting the chairperson, for example the first microphone MC1 located in the vicinity of the operation unit 15 is used as the chair's microphone. Naturally, the chairperson's microphone may be arbitrary microphone.

Note that, when the chairperson repeatedly using the sound pickup apparatus is the same, this processing can be omitted. Alternatively, the microphone at the position where the chairperson sits may be determined in advance too. In this case, no operation for selection of the chairperson is necessary each time.

Naturally, the selection of the chairperson is not limited to the initial state and can be carried out at arbitrary timing.

(3) Adjustment of Sensitivity Difference of Microphones

As the initial operation, preferably the gain of the amplification unit for amplifying signals of the microphones MC1 to MC6 or the attenuation value of the attenuation unit is automatically adjusted so that the acoustic couplings between the receiving and reproduction speaker 16 and the microphones MC1 to MC6 become equal.

As the usual processing, various types of processings exemplified below are carried out.

(1) Processing for Selection and Switching of Microphones

When a plurality of conference participants simultaneously speak in one conference room, the audio is mixed and hard to understand by the conference participants A1 to A6 in the conference room of the other party. Therefore, in the present invention, in principle, only one person is allowed to speak in a certain time interval. For this, the DSP 25 performs processing for selecting and switching the microphone.

As a result, only the speech from the selected microphone is transmitted to the communication apparatus 1 of the conference room of the other party via the telephone line 920 and output from the speaker. Naturally, as explained by referring to FIG. 5, the LED in the vicinity of the microphone of the selected speaking person turns on. The audio of the selected speaking person can be heard from the speaker of the communication apparatus 1 of that room as well so that it can be recognized who is the permitted speaking person.

This processing aims to select the signal of the single directivity microphone facing to the speaking person and to send a signal having a good S/N to the other party as the transmission signal.

(2) Display of Selected Microphone

Whether a microphone of the speaking person is selected and which is the microphone of the conference participant permitted to speak is made easy to recognize by all of the conference participants A1 to A6 by turning on the corresponding microphone selection result displaying means, for example, the light emission diodes LED1 to LED6.

(3) Signal Processing

As a background art of the above microphone selection processing or in order to execute the processing for the microphone selection correctly, various types of signal processing exemplified below are carried out.

(a) Processing for band separation and level conversion of sound pickup signals of microphones (b) Processing for judgment of start and end of speech For use as a trigger for start of judgment for selection of the signal of the microphone facing the direction of the speaking person (c) Processing for detection of the microphone in the direction of the speaking person For analyzing the sound pickup signals of microphones and judging the microphone used by the speaking person (d) Processing for judgment of timing of switching of the microphone in the direction of the speaking person and processing for switching the selection of the signal of the microphone facing the detected speaking person For instructing switching to the microphone selected from the above processing results (e) Measurement of floor noise at the time of normal operation <Measurement of Floor (Environment) Noises>

This processing is divided into initial processing immediately after turning on the power supply of the sound pickup apparatus and the normal processing.

Note that, the processing is carried out under the following typical preconditions.

(1) Condition: Measurement time and threshold provisional value:

1. Test tone sound pressure: −40 dB in terms of microphone signal level

2. Noise measurement unit time: 10 seconds

3. Noise measurement in normal state: Calculation of mean value by measurement results of 10 seconds further repeated 10 times to find the mean value deemed as the noise level.

(2) Standard and threshold value of valid distance by difference between floor noise and speech start reference level 1. 26 dB or more: 3 meters or more Detection level threshold value of start of speech: Floor noise level+9 dB Detection level threshold value of end of speech: Floor noise level+6 dB 2. 20 to 26 dB: Not more than 3 meters Detection level threshold value of start of speech: Floor noise level+9 dB Detection level threshold value of end of speech: Floor noise level+6 dB 3. 14 to 20 dB: Not more than 1.5 meters Detection level threshold value of start of speech: Floor noise level+9 dB Detection level threshold value of end of speech: Floor noise level+6 dB 4. 9 to 14 dB: Not more than 1 meter Difference between floor noise level and speech start reference level÷2÷2 dB Detection level threshold value of end of speech: speech start threshold value−3 dB 5. 9 dB or less: Slightly hard, several tens centimeters Detection level threshold value of start of speech:

6. Difference between floor noise level and speech start reference level÷2

Detection level threshold value of end of speech: −3 dB

7. Same or minus: Fail to be judged, selection prohibited (3) The noise measurement start threshold value of the normal processing is started from when the level of the floor noise+3 dB when turning on the power supply is obtained.

<Generation of Various Types of Frequency Component Signals by Filter Processing>

Figure 10:
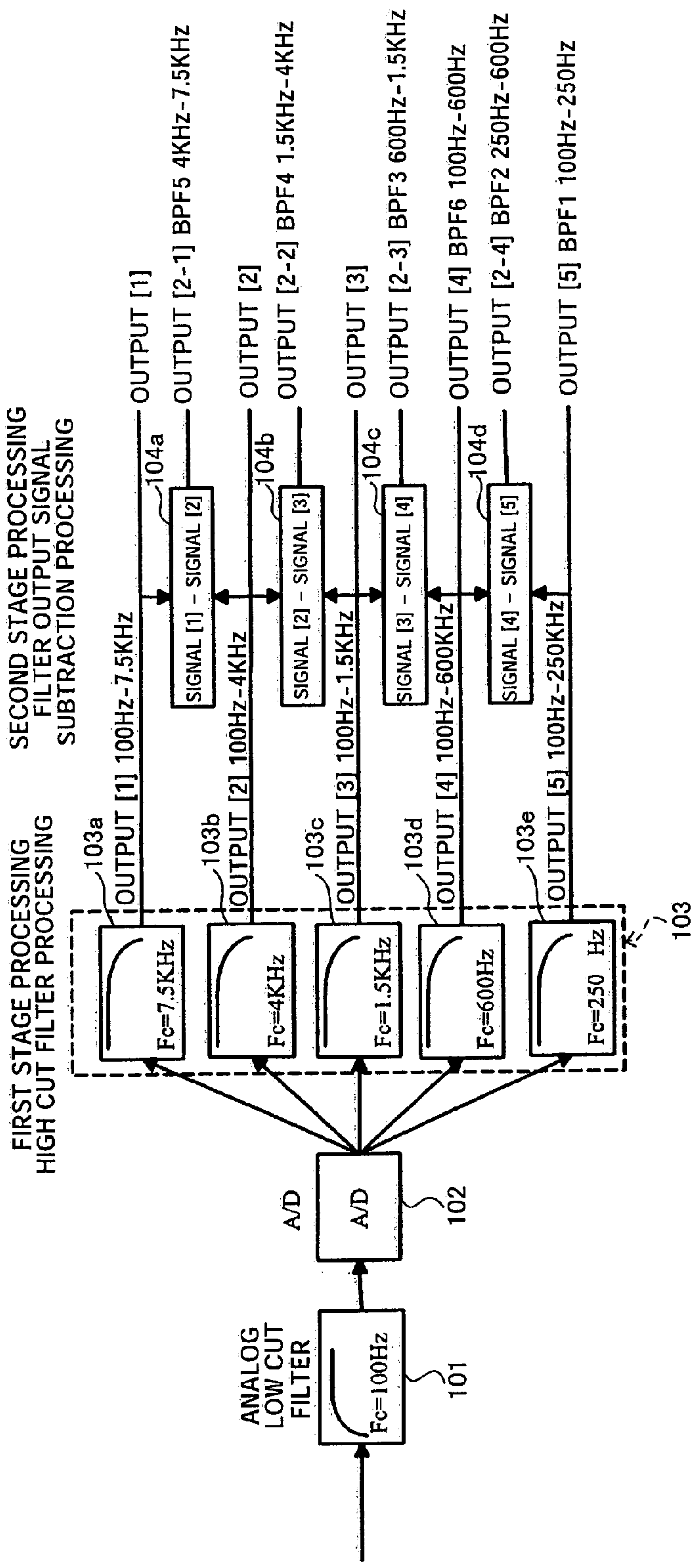
FIG. 10 is a view of filter processing in the sound pickup apparatus of the present invention.

FIG. 10 is a view of the configuration showing the filter processing performed at the DSP 25 using the sound signals picked up by the microphones as pre-processing. FIG. 10 shows the processing for one microphone (channel (one sound pickup signal)).

The sound pickup signals of microphones are processed at an analog low cut filter 101 having a cut-off frequency of for example 100 Hz, the filtered voice signals from which the frequency of 100 Hz or less was removed are output to the A/D converter 102, and the sound pickup signals converted to the digital signals at the A/D converter 102 are stripped of their high frequency components at the digital high cut filters 103*a* to 103*e* (referred to overall as 103) having cut-off frequencies of 7.5 kHz, 4 kHz, 1.5 kHz, 600 Hz, and 250 Hz (high cut processing). The results of the digital high cut filters 103*a* to 103*e* are further subtracted by the filter signals of the adjacent digital high cut filters 103*a* to 103*e* in the subtracters 104*a* to 104*d* (referred to overall as 104).

In this embodiment of the present invention, the digital high cut filters 103*a* to 103*e* and the subtracters 104*a* to 104*e* are actually realized by processing in the DSP 25. The A/D converter 102 can be realized as part of the A/D converter block 27.

Figure 11:
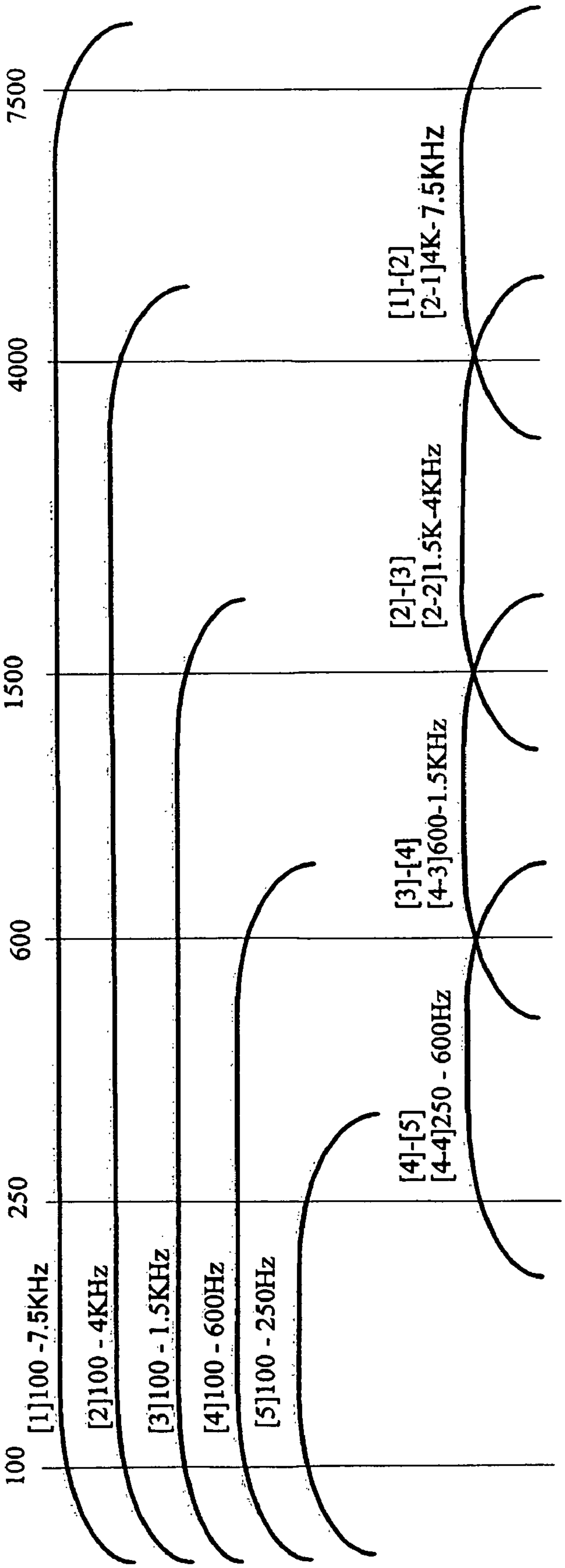
FIG. 11 is a view of a frequency characteristic of processing results of FIG. 10.

FIG. 11 is a view of the frequency characteristic showing the filter processing result explained by referring to FIG. 10. In this way, a plurality of signals having various types of frequency components are generated from signals picked up by microphones having single directivity.

<Band-Pass Filter Processing and Microphone Signal Level Conversion Processing>

Figure 12:
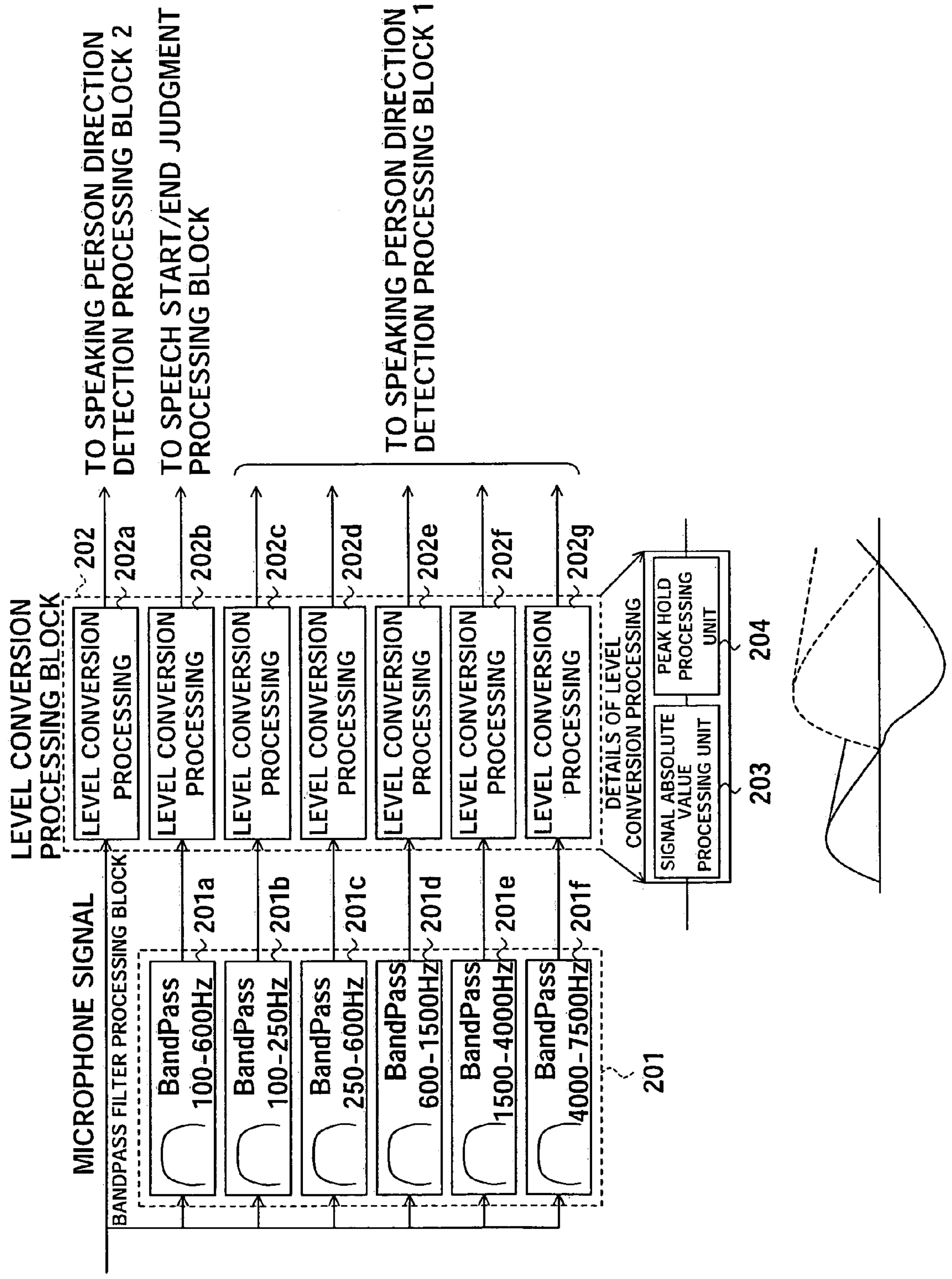
FIG. 12 is a block diagram of band pass filter processing and level conversion processing of the present invention.

As one of the triggers for start of the microphone selection processing, the start and end of the speech is judged. The signal used for this is obtained by the band-pass filter processing and the level conversion processing illustrated in FIG. 12 performed at the DSP 25. FIG. 12 shows only one channel (CH) of the processing of six channels of input signals picked up at the microphones MC1 to MC6. The band-pass filter processing and level conversion processing unit in the DSP 25 have, for the channels of the sound pickup signals of the microphones, band-pass filters 201*a* to 201*e* (referred to overall as the "band-pass filter block 201") having band-pass characteristic of 100 to 600 Hz, 200 to 250 Hz, 250 to 600 Hz, 600 to 1500 Hz, 1500 to 4000 Hz, and 4000 to 7500 Hz and level converters 202*a* to 202*g* (referred to overall as the "level converter block 202") for converting the levels of the original microphone sound pickup signals and the band-passed sound pickup signals.

Each of the level conversion units 202*a* to 202*g* has a signal absolute value processing unit 203 and a peak hold processing unit 204. Accordingly, as illustrated by the waveform diagram, the signal absolute value processing unit 203 inverts the sign when receiving as input a negative signal indicated by a broken line to converts the same to a positive signal. The peak hold processing unit 204 holds the maximum value of the output signals of the signal absolute value processing unit 203. Note that in the present embodiment, the held maximum value drops a little along with the elapse of time. Naturally, it is also possible to improve the peak hold processing unit 204 to reduce the amount of drop and enable the maximum value to be held for a long time.

The band-pass filter will be explained next. The band-pass filter used in the communication apparatus 1 is for example comprised of just a secondary IIR high cut filter and a low cut filter of the microphone signal input stage. The present embodiment utilizes the fact that if a signal passed through the high cut filter is subtracted from a signal having a flat frequency characteristic, the remainder becomes substantially equivalent to a signal passed through the low cut filter.

In order to match the frequency-level characteristic, one extra band of the band-pass filters of the full band-pass becomes necessary. The necessary band-pass is obtained by the number of bands and filter coefficients of the number of bands of the band-pass filters+1. The band frequency of the band-pass filter necessary this time is the following six bands of band-pass filters shown in the followings per channel (CH) of the microphone signal:

| BP characteristic | Band-pass filter |
|---|---|
| BPF1 = [100 Hz-250 Hz] | 201b |
| BPF2 = [250 Hz-600 Hz] | 201c |
| BPF3 = [600 Hz-1.5 kHz] | 201d |
| BPF4 = [1.5 kHz-4 kHz] | 201e |
| BPF5 = [4 kHz-7.5 kHz] | 201f |
| BPF6 = [100 Hz-600 Hz] | 201a |

In this method, the computation program of the IIR filters in the DSP 25 is only 6 CH (channel)×5 (IIR filter)=30. Compare this with the configuration of conventional band-pass filters.

In the embodiment of the present invention, 100 Hz low cut filter processing is realized by the analog filters of the input stage. There are five cut-off frequencies of the prepared secondary IIR high cut filters: 250 Hz, 600 Hz, 1.5 kHz, 4 kHz, and 7.5 kHz. The high cut filter having the cut-off frequency of 7.5 kHz among them actually has a sampling frequency of 16 kHz, so is unnecessary, but the phase of the subtracted number is intentionally rotated (changed) in order to reduce the phenomenon of the output level of the band-pass filter being reduced due to phase rotation of the IIR filter in the step of the subtraction processing.

Figure 13:
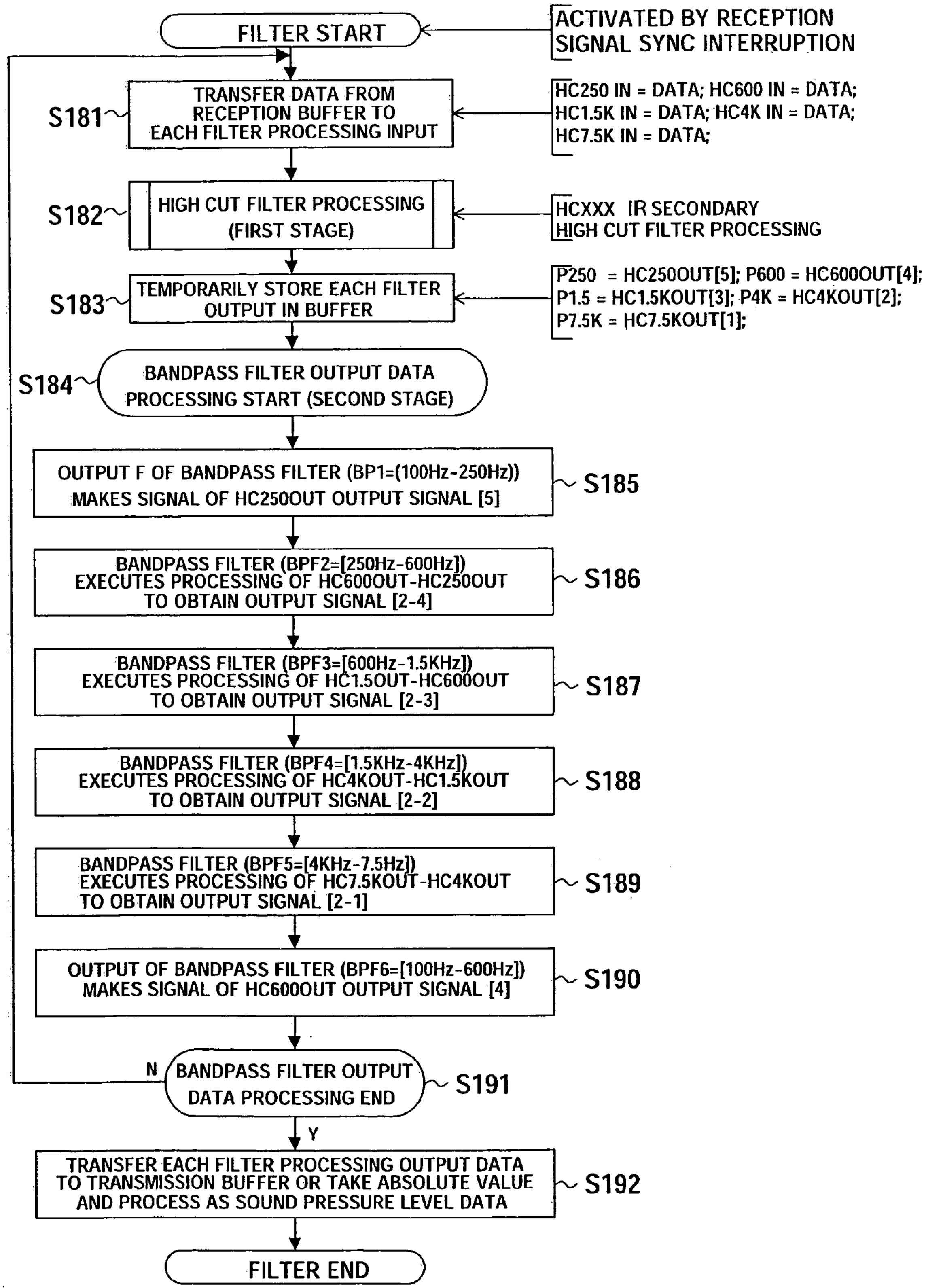
FIG. 13 is a flowchart of the processing of FIG. 12.

FIG. 13 is a flowchart of the processing by the configuration illustrated in FIG. 12 at the DSP 25.

In the filter processing at the DSP 25 illustrated in FIG. 13, the high pass filter processing is carried out as the first stage of processing, while the subtraction processing from the result of the first stage of the high pass filter processing is carried out as the second stage of processing. FIG. 11 is a view of the image frequency characteristic of the results of the signal processing. In the following explanation, [x] shows each processing case in FIG. 11.

<First Stage>

[1] For the full band-pass filter, the input signal is passed through the 7.5 kHz high cut filter. This filter output signal becomes the band-pass filter output of [100 Hz-7.5 kHz] by the analog low cut matching of inputs.

[2] The input signal is passed through the 4 kHz high cut filter. This filter output signal becomes the band-pass filter output of [100 Hz-4 kHz] by combination with the input analog low cut filter.

[3] The input signal is passed through the 1.5 kHz high cut filter. This filter output signal becomes the band-pass filter output of [100 Hz-1.5 kHz] by combination with the input analog low cut filter.

[4] The input signal is passed through the 600 kHz high cut filter. This filter output signal becomes the band-pass filter output of [100 Hz-600 kHz] by combination with the input analog low cut filter.

[5] The input signal is passed through the 250 kHz high cut filter. This filter output signal becomes the band-pass filter output of [100 Hz-250 kHz] by combination with the input analog low cut filter.

<Second Stage>

[1] When the band-pass filter (BPF5=[4 kHz to 7.5 kHz]) executes the processing of the filter output [1]-[2] ([100 Hz to 7.5 kHz]-[100 Hz to 4 kHz]), the above signal output [4 kHz to 7.5 kHz] is obtained.

[2] When the band-pass filter (BPF4=[1.5 kHz to 4 kHz]) executes the processing of the filter output [2]-[3] ([100 Hz to 4 kHz]-[100 Hz to 1.5 kHz]), the above signal output [1.5 kHz to 4 kHz] is obtained.

[3] When the band-pass filter (BPF3=[60 kHz to 1.5 kHz]) executes the processing of the filter output [3]-[4] ([100 Hz to 1.5 kHz]-[100 Hz to 600 Hz]), the above signal output [600 Hz to 1.5 kHz] is obtained.

[4] When the band-pass filter (BPF2=[250 Hz to 600 Hz]) executes the processing of the filter output [4]-[5] ([100 Hz to 600 Hz]-[100 Hz to 250 Hz]), the above signal output [250 Hz to 600 Hz] is obtained.

[5] The band-pass filter (BPF1=[100 Hz to 250 Hz]) defines the signal of the above [5] as is as the output signal of the above [5].

[6] The band-pass filter (BPF6=[100 Hz to 600 Hz]) defines the signal of the above [4] as is as the output signal of the above [4].

The necessary band-pass filter output is obtained by the above processing in the DSP 25.

The input sound pickup signals MIC1 to MIC6 of the microphones are constantly updated as in Table 1 as the sound pressure level of the entire band and the six bands of sound pressure levels passed through the band-pass filter.

TABLE 1

Results of Conversion of Signal Levels

| | BPF1 | BPF2 | BPF3 | BPF4 | BPF5 | BPF6 | ALL |
|---|---|---|---|---|---|---|---|
| MIC1 | L1-1 | L1-2 | L1-3 | L1-4 | L1-5 | L1-6 | L1-A |
| MIC2 | L2-1 | L2-2 | L2-3 | L2-4 | L2-5 | L2-6 | L2-A |
| MIC3 | L3-1 | L3-2 | L3-3 | L3-4 | L3-5 | L3-6 | L3-A |
| MIC4 | L4-1 | L4-2 | L4-3 | L4-4 | L4-5 | L4-6 | L4-A |
| MIC5 | L5-1 | L5-2 | L5-3 | L5-4 | L5-5 | L5-6 | L5-A |
| MIC6 | L6-1 | L6-2 | L6-3 | L6-4 | L6-5 | L6-6 | L6-A |

In Table 1, for example, L1-1 indicates the peak level when the sound pickup signal of the microphone MC1 passes through the first band-pass filter 201*a*. In the judgment of the start and end of speech, use is made of the microphone sound pickup signal passed through the 100 Hz to 600 Hz band-pass filter 201*a* illustrated in FIG. 17 and converted in sound pressure level at the level conversion unit 202*b*.

<Processing for Judgment of Start and End of Speech>

Figure 14:
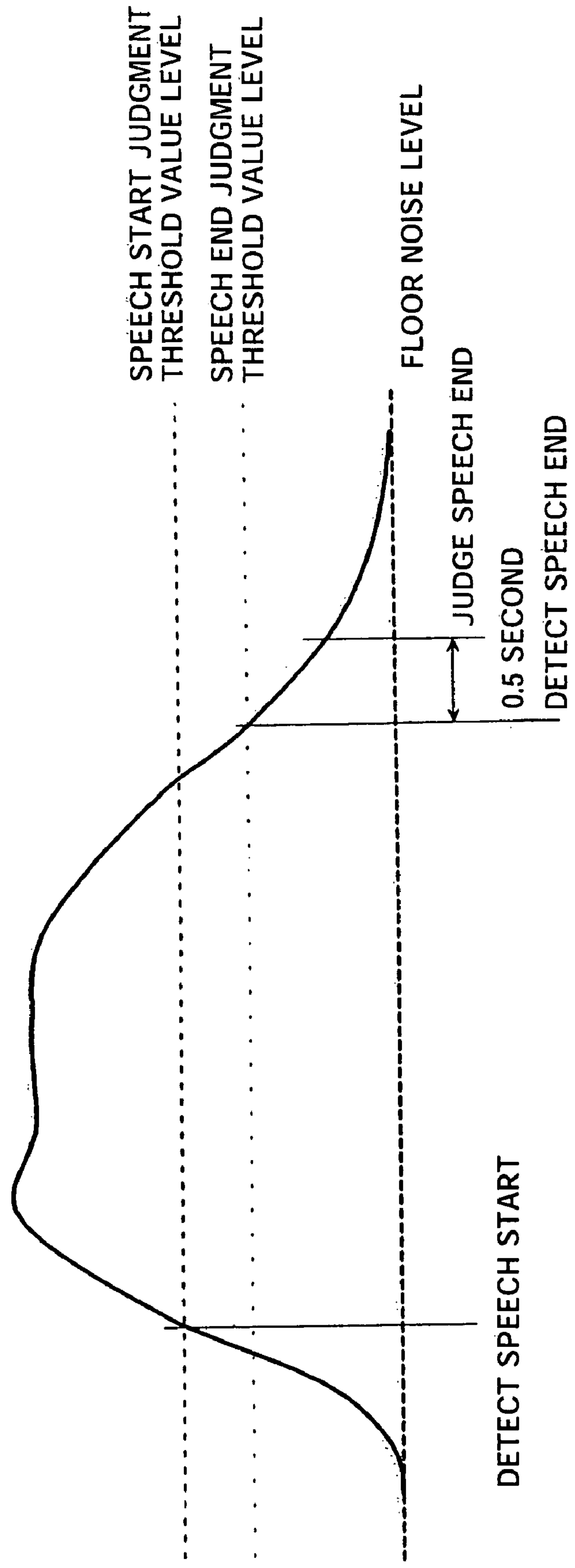
FIG. 14 is a graph showing processing for judging a start and an end of speech in the sound pickup apparatus of the embodiment of the present invention.

Based on the value output from the sound pressure level detection unit, as illustrated in FIG. 14, the first digital signal processor (DSP1) 25 judges the start of speech when the microphone sound pickup signal level rises over the floor noise and exceeds the threshold value of the speech start level, judges speech is in progress when a level higher than the threshold value of the start level continues after that, judges there is floor noise when the level falls below the threshold value of the end of speech, and judges the end of speech when the level continues for the speech end judgment time, for example, 0.5 second.

The start judgment of speech judges the start of speech from the time when the sound pressure level data (microphone signal level (1)) passing through the 100 Hz to 600 Hz band-pass filter and converted in sound pressure level at the microphone signal conversion processing unit 202*b* illustrated in FIG. 12 becomes higher than the threshold value level illustrated in FIG. 14.

The DSP 25 is designed not to detect the start of the next speech during the speech end judgment time, for example, 0.5 second, after detecting the start of speech in order to avoid the malfunctions accompanying frequent switching of the microphones.

<Microphone Selection>

The DSP 25 detects the direction of the speaking person in the mutual speech system and automatically selects the signal of the microphone facing to the speaking person based on the so-called "score card method" selecting sequentially from a high signal. Details of the "score card method" will be explained later.

Figure 15:
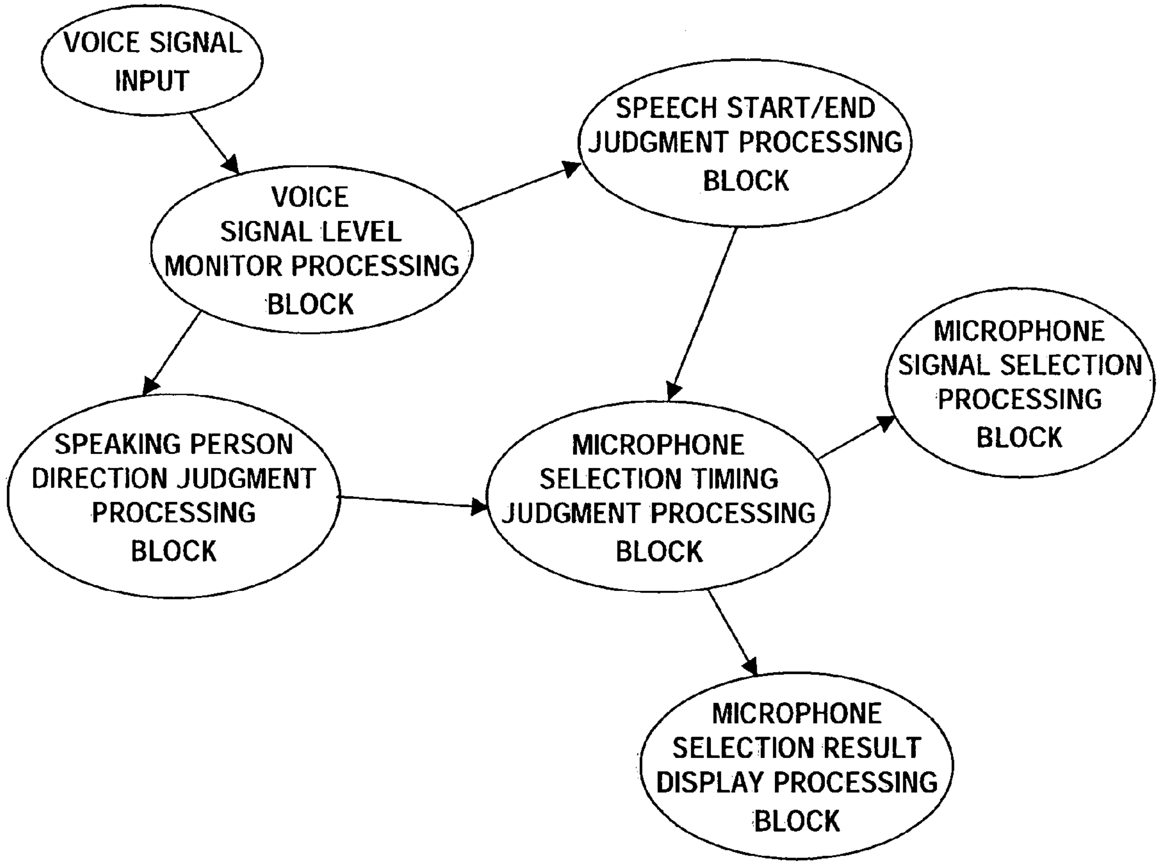
FIG. 15 is a graph of the flow of normal processing in the sound pickup apparatus of the embodiment of the present invention.

FIG. 15 is a view illustrating the types of operation of the sound pickup apparatus.

Figure 16:
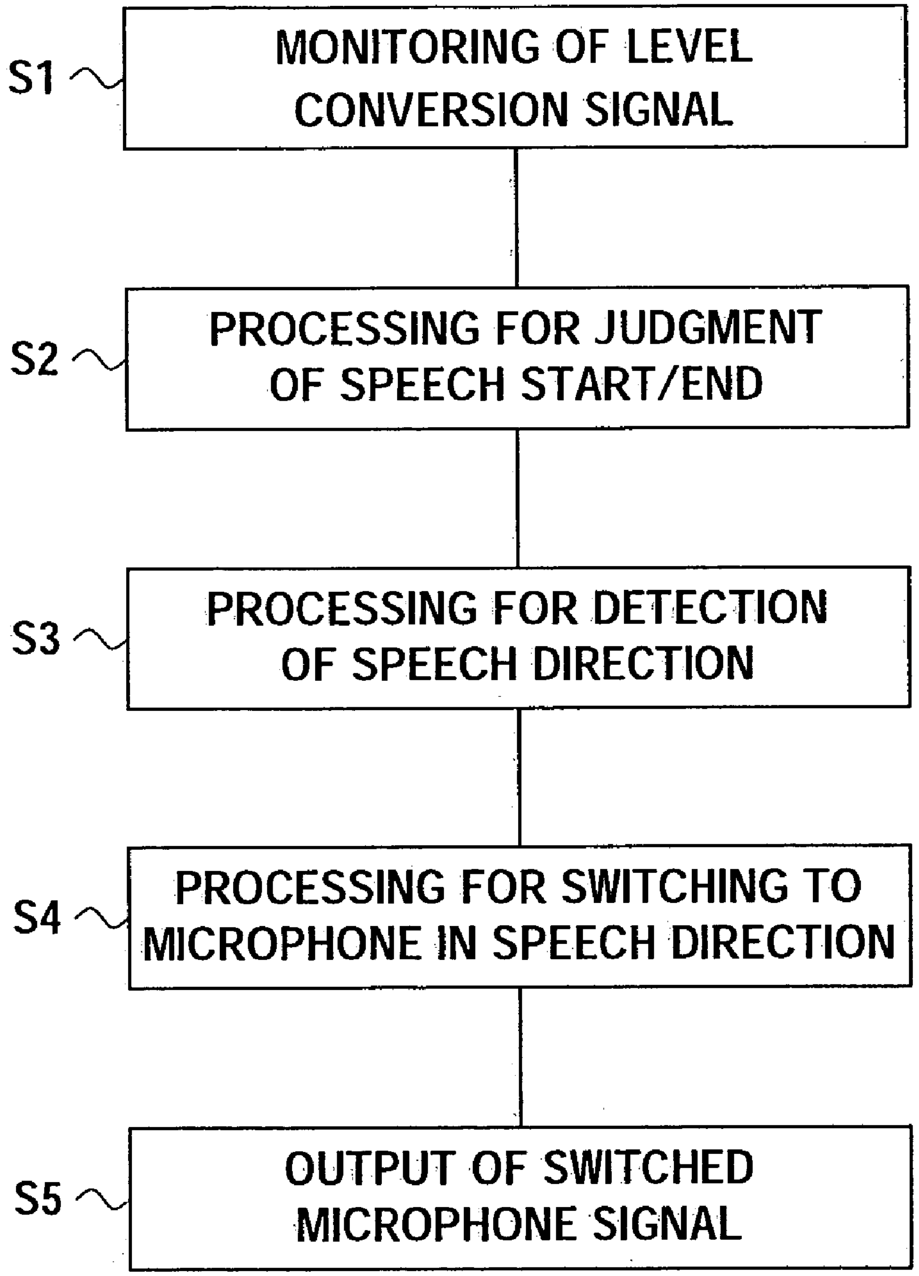
FIG. 16 is a flowchart of the flow of normal processing in the sound pickup apparatus of the embodiment of the present invention.

FIG. 16 is a flowchart showing the normal processing of the sound pickup apparatus.

The sound pickup apparatus, as illustrated in FIG. 15, performs processing for monitoring the sound signal in accordance with the sound pickup signals from the microphones MC1 to MC6, judges the speech start/end, judges the speech direction, and selects the microphone and displays the results on the microphone selection result displaying means 30, for example, the light emission diodes LED1 to LED6.

Hereinafter, a description will be given of the operation mainly using the DSP 25 in the sound pickup apparatus by referring to the flowchart of FIG. 16. Note that, the overall control of the microphone electronic circuit housing 2 is carried out by the microprocessor 23, but the description will be given focusing on the processing of the DSP 25.

{Step S1: Monitoring of Level Conversion Signal}

The signals picked up at the microphones MC1 to MC6 are converted as seven types of level data in the band-pass filter block 201 and the level conversion block 202 explained by referring to FIG. 11 to FIG. 13, especially FIG. 12, so the DSP 25 constantly monitors seven types of signals for the microphone sound pickup signals.

Based on the monitor results, the DSP 25 shifts to either processing of the speaking person direction detection processing, the speaking person direction detection processing, or the speech start end judgment processing.

{Step S2: Processing for Judgment of Speech Start/End}

The DSP 25 judges the start and end of speech by referring to FIG. 14 and further according to the method explained in detail below. When detecting the start of speech, the DSP 25 informs the detection of the speech start to the speaking person direction judgment processing of step S4.

Note that, in the processing for judgment of the start and end of speech at step S2, when the speech level becomes smaller than the speech end level, the timer of the speech end judgment time (for example 0.5 second) is activated. When the speech level is smaller than the speech end level during the speech end judgment, it is judged that the speech has ended.

When it becomes larger than the speech end level during the speech end judgment, the wait processing is entered until it becomes smaller than the speech end level again.

{Step S3: Processing for Detection of Speaking Person Direction}

The processing for detection of the speaking person direction in the DSP 25 is carried out by searching for the speaking person direction constantly and continuously. Thereafter, the data is supplied to the processing for judgment of the speaking person direction of step S4.

{Step S4: Processing for Switching of Speaking Person Direction Microphone}

The processing for judgment of timing in the processing for switching the speaking person direction microphone in the DSP 25 instructs the selection of a microphone in a new speaking person direction to the processing for switching the microphone signal of step S4 when the results of the processing of step S2 and the processing of step S3 are that the speaking person detection direction at that time and the speaking person direction which has been selected up to now are different.

However, when the chairperson's microphone has been set from the operation unit 15 and the chairperson's microphone and other conference participants simultaneously speak, priority is given to the speech of the chairperson.

At this time, the selected microphone information is displayed on the microphone selection result displaying means, for example, the light emission diodes LED1 to LED6.

{Step S5: Transmission of Microphone Sound Pickup Signals}

The processing for switching the microphone signal transmits only the microphone signal selected by the processing of step S4 from among the six microphone signals as, for example, the transmission signal from the first sound pickup apparatus 10A to the second sound pickup apparatus 10B of the other party via the communication line 920, so outputs it to the line-out terminal of the communication line 920 illustrated in FIG. 5.

<Judgment of Speech Start>

{Processing 1}: The output levels of the sound pressure level detector corresponding to the six microphones and the threshold value of the speech start level are compared.

The start of speech is judged when the output level exceeds the threshold value of the speech start level. When the output levels of the sound pressure level detector corresponding to all microphones exceed the threshold value of the speech start level, the DSP 25 judges the signal to be from the receiving and reproduction speaker 16 and does not judge that speech has started. This is because the distances between the receiving and reproduction speaker 16 and all microphones MC1 to MC6 are the same, so the sound from the receiving and reproduction speaker 16 reaches all microphones MC1 to MC6 almost equally.

{Processing 2}: Three sets of microphones each comprised of two single directivity microphones (microphones MC1 and MC4, microphones MC2 and MC5, and microphones MC3 and MC6) obtained by arranging the six microphones illustrated in FIG. 4 at equal angles of 60 degrees radially and at equal intervals and having directivity axes shifted by 180 degrees in opposite directions are prepared, and the level differences of microphone signals (MIC signals) are utilized. Namely, the following operations are executed:

$$\text{Absolute value of (signal level of } MIC\ 1 - \text{signal level of } MIC\ 4) \quad [1]$$

$$\text{Absolute value of (signal level of } MIC\ 2 - \text{signal level of } MIC\ 5) \quad [2]$$

$$\text{Absolute value of (signal level of } MIC\ 3 - \text{signal level of } MIC\ 6) \quad [3]$$

The DSP 25 compares the above absolute values [1], [2], and [3] with the threshold value of the speech start level and judges the speech start when the absolute value exceeds the threshold value of the speech start level.

In the case of this processing, all absolute values do not become larger than the threshold value of the speech start level unlike the processing 1 (since sound from the receiving and reproduction speaker 16 equally reaches all microphones), so judgment of whether the sound is from the receiving and reproduction speaker 16 or audio from a speaking person becomes unnecessary.

<Processing for Detection of Speaking Person Direction>

For the detection of the speaking person direction, the characteristic of the single directivity microphones exemplified in FIG. 6 are utilized. In the single directivity characteristic microphones, as exemplified in FIG. 6, the frequency characteristic and level characteristic change according to the angle of the audio from the speaking person reaching the microphones. The results are shown in FIGS. 7A to 7D. FIGS. 7A to 7D show the results of application of a fast Fourier transform (FFT) to audio picked up by microphones at constant time intervals by placing the speaker a predetermined distance from the sound pickup apparatus 10A, for example, a distance of 1.5 meters. The X-axis represents the frequency, the Y-axis represents the signal level, and the Z-axis represents time. The lateral lines represent the cut-off frequency of the band-pass filter. The level of the frequency band sandwiched by these lines becomes the data from the microphone signal level conversion processing passing through five bands of band-pass filters and converted to the sound pressure level explained by referring to FIG. 10 to FIG. 13.

The method of judgment applied as the actual processing for detecting the speaking person direction in the sound pickup apparatus according to the embodiment of the present invention will be described next.

Suitable weighting processing (0 when 0 dBFs in a 1 dB full span (1 dBFs) step, while 3 when −3 dBFs, or vice versa) is carried out with respect to the output level of each band of band-pass filter. The resolution of the processing is determined by this weighting step.

The above weighting processing is executed for each sample clock, the weighted scores of each microphone are added, the result is averaged for the constant number of samples, and the microphone signal having a small (large) total points is judged as the microphone facing the speaking person. The following Table 2 indicates the results of this as an image.

TABLE 2

Case Where Signal Levels Are Represented by Points

| | BPF1 | BPF2 | BPF3 | BPF4 | BPF5 | Sum |
|---|---|---|---|---|---|---|
| MIC1 | 20 | 20 | 20 | 20 | 20 | 100 |
| MIC2 | 25 | 25 | 25 | 25 | 25 | 125 |
| MIC3 | 30 | 30 | 30 | 30 | 30 | 150 |
| MIC4 | 40 | 40 | 40 | 40 | 40 | 200 |
| MIC5 | 30 | 30 | 30 | 30 | 30 | 150 |
| MIC6 | 25 | 25 | 25 | 25 | 25 | 125 |

In the example illustrated in Table 2, the first microphone MC1 has the smallest total points, so the DSP 25 judges that there is a sound source (there is a speaking person) in the direction of the first microphone MC1. The DSP 25 holds the result in the form of a sound source direction microphone number.

As explained above, the DSP 25 weights the output level of the band-pass filter of the frequency band for each microphone, ranks the outputs of the bands of band-pass filters in the sequence from the microphone signal having the smallest (largest) point up, and judges the microphone signal having the first order for three bands or more as from the microphone facing the speaking person. Then, the DSP 25 prepares the score card for the "score card method" as in the following Table 3 indicating that there is a sound source (there is a speaking person) in the direction of the first microphone MC1.

TABLE 3

| Case Where Signals Passed Through Band-pass Filters Are Ranked In Level Sequence | | | | | | |
|---|---|---|---|---|---|---|
| | BPF1 | BPF2 | BPF3 | BPF4 | BPF5 | Sum |
| MIC1 | 1 | 1 | 1 | 1 | 1 | 5 |
| MIC2 | 2 | 2 | 2 | 2 | 2 | 10 |
| MIC3 | 3 | 3 | 3 | 3 | 3 | 15 |
| MIC4 | 4 | 4 | 4 | 4 | 4 | 20 |
| MIC5 | 3 | 3 | 3 | 3 | 3 | 15 |
| MIC6 | 2 | 2 | 2 | 2 | 2 | 10 |

In actuality, due to the influence of the reflection of sound and standing wave according to the characteristic of the room where the sound pickup apparatus is placed, the result of the first microphone MC1 does not constantly become the top among the outputs of all band-pass filters, but if the first rank in the majority of five bands, it can be judged that there is a sound source (there is a speaking person) in the direction of the first microphone MC1. The DSP 25 holds the result in the form of the sound source direction microphone number.

The DSP 25 totals up the output level data of the bands of the band-pass filters of the microphones in the form shown in the following, judges the microphone signal having a large level as from the microphone facing the speaking person, and holds the result in the form of the sound source direction microphone number. This is called as "score card table".

$$MIC1\text{ Level}=L1-1+L1-2+L1-1+L1-4+L1-5$$

$$MIC2\text{ Level}=L2-1+L2-2+L2-1+L2-4+L2-5$$

$$MIC3\text{ Level}=L3-1+L3-2+L3-1+L3-4+L3-5$$

$$MIC4\text{ Level}=L4-1+L4-2+L4-1+L4-4+L4-5$$

$$MIC5\text{ Level}=L5-1+L5-2+L5-1+L5-4+L5-5$$

$$MIC6\text{ Level}=L6-1+L6-2+L6-1+L6-4+L6-5$$

<Processing for Judgment of Switch Timing of Speaking Person Direction Microphone>

When activated by the speech start judgment result of step S2 of FIG. 16 and detecting the microphone of a new speaking person from the detection processing result of the speaking person direction of step S3 and the past selection information, the DSP 25 issues a switch command of the microphone signal to the processing for switching selection of the microphone signal of step S5, notifies the microphone selection result displaying means (light emission diodes LED1 to 6) that the speaking person microphone was switched, and thereby informs the speaking person that the sound pickup apparatus has responded to his speech.

In order to eliminate the influence of reflection sound and the standing wave in a room having a large echo, the DSP 25 prohibits the issuance of a new microphone selection command unless the speech end judgment time (for example 0.5 second) passes after switching the microphone.

It prepares two microphone selection switch timings from the microphone signal level conversion processing result of step S1 of FIG. 16 and the detection processing result of the speaking person direction of step S3 in the present embodiment.

{First method}: Time when speech start can be clearly judged

Case where speech from the direction of the selected microphone is ended and there is new speech from another direction.

In this case, the DSP 25 decides that speech is started after the speech end judgment time (for example 0.5 second) or more passes after all microphone signal levels (1) and microphone signal levels (2) become the speech end threshold value level or less and when either of microphone signal level (1) becomes the speech start threshold value level or more, determines the microphone facing the speaking person direction as the legitimate sound pickup microphone based on the information of the sound source direction microphone number, and starts the microphone signal selection switch processing of step S5.

{Second method}: Case where there is new speech of larger voice from another direction during period where speech is continued In this case, the DSP 25 starts the judgment processing after the speech end judgment time (for example 0.5 second) or more passes from the speech start (time when the microphone signal level (1) becomes the threshold value level or more).

When it judges that the sound source direction microphone number from the processing of S3 changed before the detection of the speech end and it is stable, the DSP 25 decides there is a speaking person speaking with a larger voice than the speaking person which is selected at present at the microphone corresponding to the sound source direction microphone number, determines the sound source direction microphone as the legitimate sound pickup microphone, and activates the microphone signal selection switch processing of step S5.

<Processing for Switching Selection of Signal of Microphone Facing Detected Speaking Person>

The DSP 25 is activated by the command selectively judged by the command from the switch timing judgment processing of the speaking person direction microphone of step S4 of FIG. 16.

Figure 17:
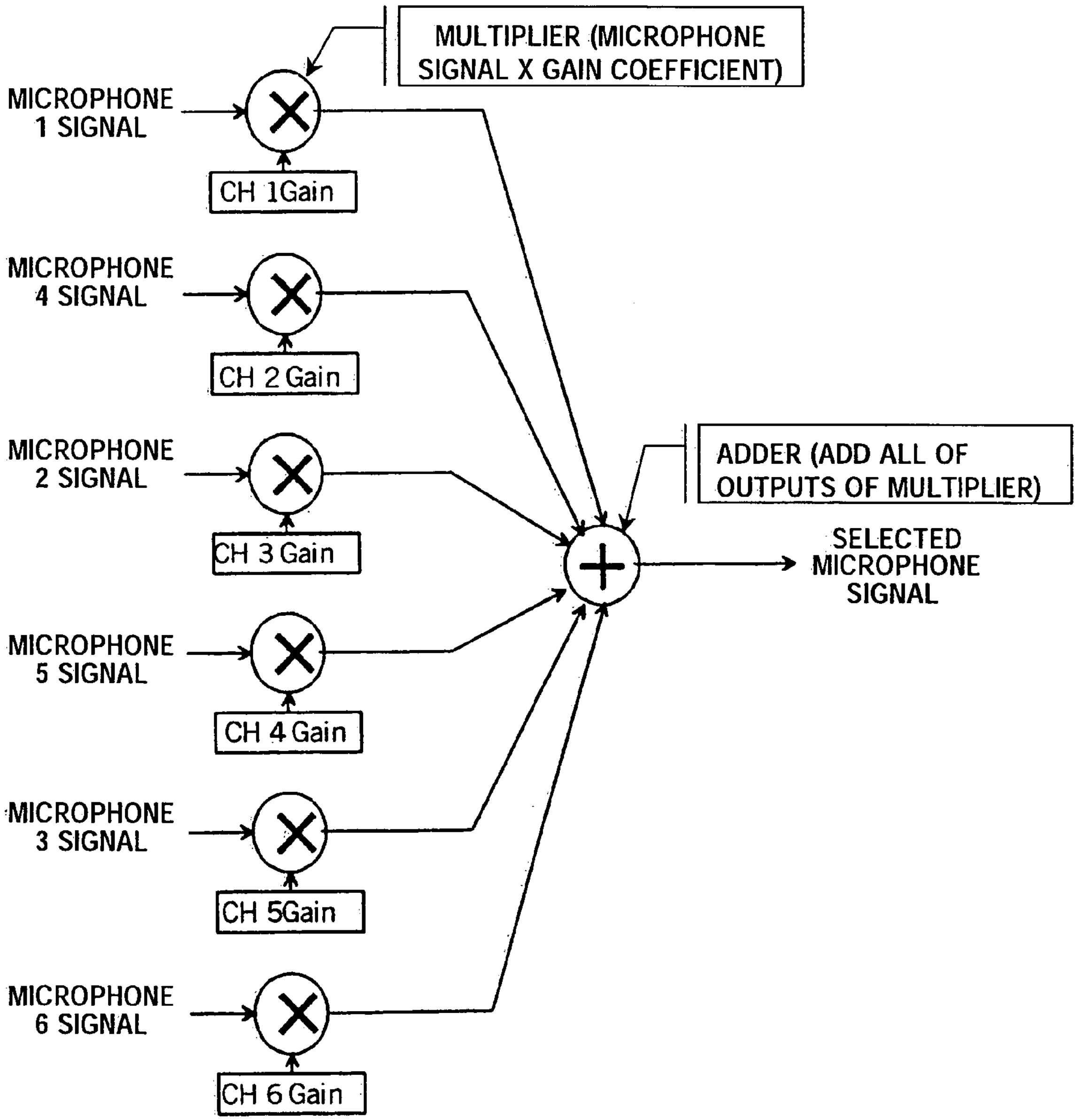
FIG. 17 is a block diagram illustrating microphone switching processing in the sound pickup apparatus of the embodiment of the present invention.

The processing for switching the selection of the microphone signal of the DSP 25 is realized by six multipliers and a six input adder as illustrated in FIG. 17. In order to select the microphone signal, the DSP 25 makes the channel gain (CH gain) of the multiplier to which the microphone signal to be selected is connected [1] and makes the CH gain of the other multipliers [0], whereby the adder adds the selected signal of (microphone signal×[1]) and the processing result of (microphone signal×[0]) and gives the desired microphone selection signal at the output.

Figure 18:
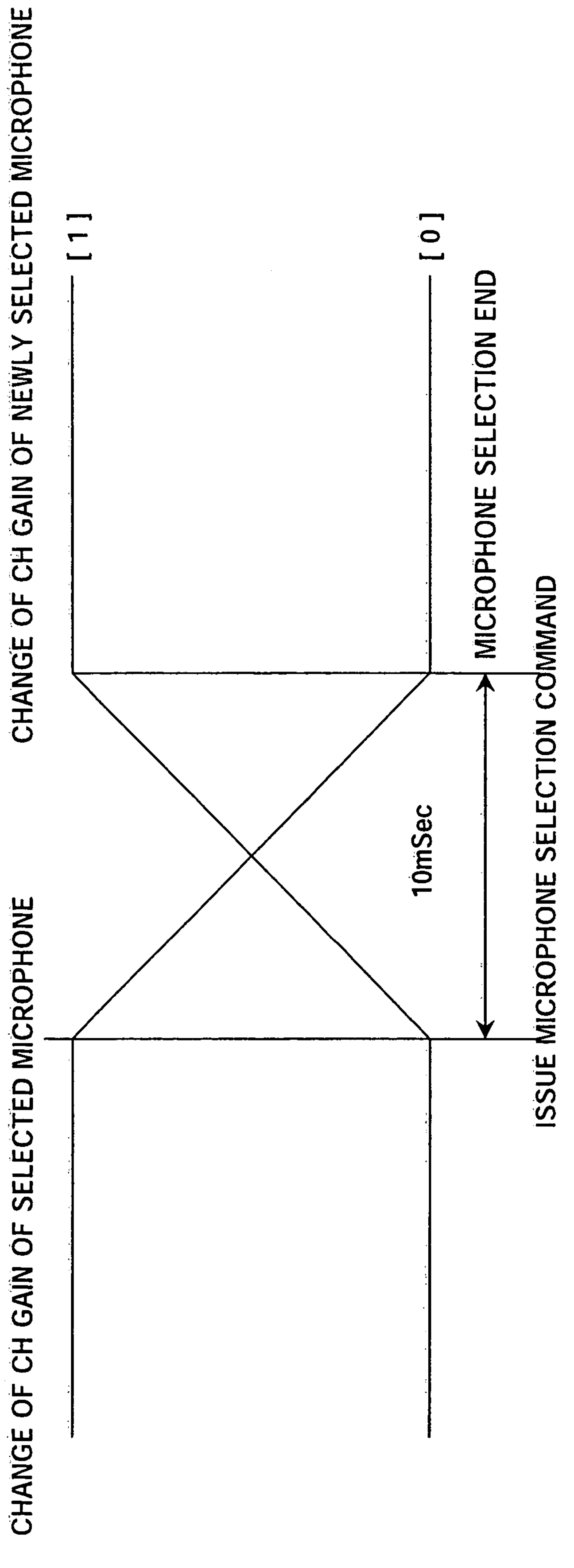
FIG. 18 is a block diagram illustrating a method of the microphone switching processing in the sound pickup apparatus of the second embodiment of the present invention.

When the channel gain is switched to [1] or [0] as described above, there is a possibility that a clicking sound will be generated due to the level difference of the microphone signals switched. Therefore, in the sound pickup apparatus, as illustrated in FIG. 18, the change of the CH gain from [1] to [0] and [0] to [1] is made continuous for the switch transition time, for example, a time of 10 msec, to cross and thereby avoid the clicking sound due to the level difference of the microphone signals.

Further, by setting the maximum channel gain to other than [1], for example [0.5], the echo cancellation processing operation in the later DSP 25 can be adjusted.

As explained above, the sound pickup apparatus of the first embodiment of the present invention can be effectively applied to a call processing of a conference without the influence of noise.

The communication apparatus of the first embodiment of the present invention has the following advantages from the viewpoint of structure:

(1) The positional relationships between the plurality of microphones having the single directivity and the receiving and reproduction speaker are constant and the distances between them are very close, therefore the level of the sound output from the receiving and reproduction speaker directly returning is overwhelmingly larger and dominant than the level of the sound output from the receiving and reproduction speaker passing through the conference room (room) environment and returning to the plurality of microphones. Due to this, the characteristic of the sound reaching from the receiving and reproduction speaker to the plurality of microphones (signal levels (intensities)) and the frequency characteristic (f characteristic and phases) of it are constantly the same. That is, the sound pickup apparatus of the present invention has the advantage that the transmission function is constantly the same.

(2) Therefore, there is the advantage that there is no change of the transmission function when switching the microphone, therefore it is not necessary to adjust the gain of the microphone system whenever the microphone is switched. In other words, there is the advantage that it is not necessary to re-do the adjustment when the adjustment is once carried out at the time of manufacture of the communication apparatus.

(3) Even if the microphone is switched for the same reason as the above description, the number of echo cancellers configured by the digital signal processor (DSP) may be kept to one. A DSP is expensive, and the space for arranging the DSP on the printed circuit board, which has little empty space since various members are mounted, may be kept small.

(4) The transmission functions between the receiving and reproduction speaker and the plurality of microphones are constant, so there is the advantage that the adjustment of the sensitivity difference of a microphone per se of ±3 dB can be carried out just by the unit.

(5) The table on which the sound pickup apparatus is mounted became possible to utilize this as the speaker system for equally dispersing (scattering) audio having a uniform quality in the entire orientation by one receiving and reproduction speaker in the communication apparatus.

(6) The sound output from the receiving and reproduction speaker is propagated through the table surface (boundary effect) and good quality sound effectively, efficiently, and equally reaches the conference participants, the sound at the opposing side is cancelled in phase in the ceiling direction of the conference room to become a small sound, there is a little reflection sound from the ceiling direction to the conference participants, and as a result a clear sound is distributed to the participants.

(7) The sound output from the receiving and reproduction speaker simultaneously arrives at all of the plurality of microphones with the same volume, therefore it becomes easy to decide the sound is audio of a speaking person or received audio. As a result, erroneous decision in the microphone selection processing is reduced.

(8) By arranging an even number of microphones at equal angles radially and at equal intervals, the level comparison for detecting the direction can be easily carried out.

(9) By the dampers using a buffer material, the microphone support members having flexibility or resiliency, etc., the influence upon the sound pickup of the microphones due to the vibration of the sound of the receiving and reproduction speaker transmitted via the printed circuit board on which the microphones are mounted can be reduced.

(10) The sound of the receiving and reproduction speaker does not directly enter the microphones. Accordingly, in this communication apparatus, there is a little influence of the noise from the receiving and reproduction speaker.

The communication apparatus of the first embodiment of the present invention has the following advantages from the viewpoint of the signal processing:

(a) A plurality of single directivity microphones are arranged at equal intervals radially to enable the detection of the sound source direction, and the microphone signal is switched to pick up sound having a good S/N (SNR) and clear sound and transmit it to the other parties.

(b) It is possible to pick up sounds from surrounding speaking parties with a good S/N and automatically select the microphone facing the speaking person.

(c) In the present invention, as the method of the microphone selection processing, the pass audio frequency band is divided and the levels at the times of the divided frequency bands are compared to simplify the signal analysis.

(d) The microphone signal switch processing of the present invention is realized as signal processing of the DSP. All of the plurality of signals is cross faded to prevent a clicking sound from being issued when switching.

(e) The microphone selection result can be notified to microphone selection result displaying means such as light emission diodes or the outside.

Second Embodiment

A second embodiment of the present invention will be described with reference to FIGS. 19 to 21 about a detail of an echo cancellation processing.

A sound from the other party inputted via a communication path is outputted to all directions (360 degrees) evenly from the speaker 16 of the sound pickup apparatus of this side described with reference to FIGS. 2 and 3, and can be heard by conference participants in the conference room equally.

On the other side, the sound from the speaker 16 is reflected by a wall, a ceiling and so on in the conference room of this side. That reflected sound is detected with overlapped with the sound of the conference participants of this side as an echo by a plurality of, for example, six microphones MC1 to MC6 as illustrated in FIG. 20. Further, the sound from the speaker 16 may be entered to the microphones MC1 to MC6 directly, overlapped with the sound of the conference participants of this side as an echo and detected by the microphones MC1 to MC6.

As mentioned above, the sound detected by the microphones MC1 to MC6 may include not only a sound of the conference participants in the conference room of this side but a sound from the sound pickup apparatus of the other party.

Therefore, if such an echo signal is not removed from a sound signal detected by the microphones selected by the sound pickup apparatus of this side, a sound including the sound selected by the sound pickup apparatus as an echo is sent to the sound pickup apparatus of the other party, and a sound is heard where the sound includes the sound sent from this side and outputted from the speaker of the sound pickup apparatus of the other party as an echo. Therefore, it is necessary to remove such an echo.

Figure 19:
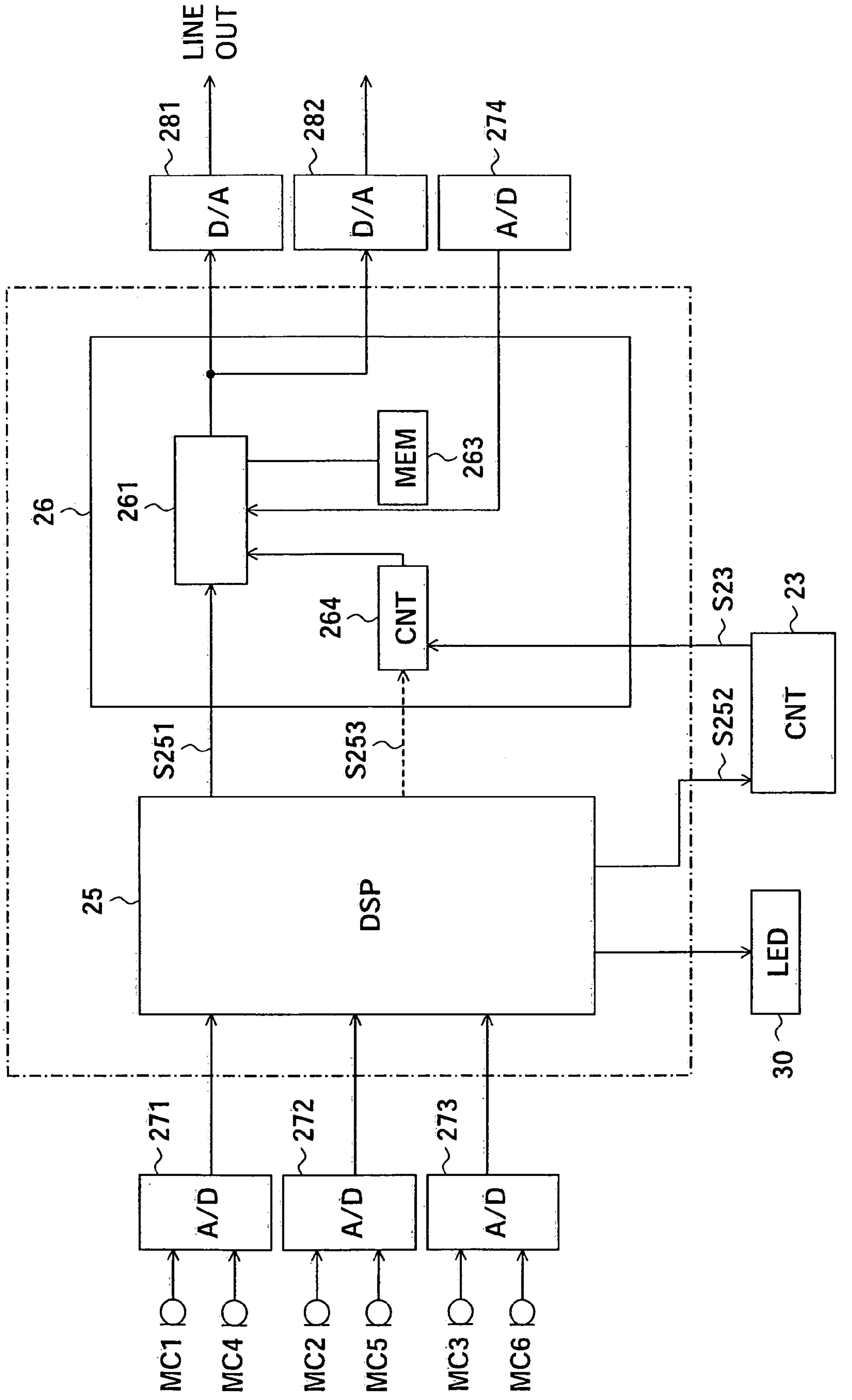
FIG. 19 is a fragmentary view of the sound pickup apparatus illustrating configuration of the second DSP (EC) in the configuration of the sound pickup apparatus illustrated in FIG. 5 as the sound pickup apparatus of the second embodiment of the present invention.

FIG. 19 is a fragmentary view of a sound pickup apparatus illustrating configuration of the second DSP 26 among the configuration of the sound pickup apparatus illustrated in FIG. 5 as a sound pickup apparatus of a second embodiment of the present invention.

The second DSP 26 operates as an echo canceller performing an above-mentioned echo cancellation processing. Hereinafter, the second DSP 26 is called as an echo canceller (EC) 26.

Such a sound from the other party becoming an echo is not detected identically for a plurality of microphones due to a difference of a position of the microphones and a reflecting state from a wall, a ceiling and so on. Therefore, the second DSP 26 performs the echo cancellation processing for each microphone. Therefore, the second DSP 26 is referred to as an echo canceller (EC) 26.

In the second embodiment, particularly, one EC 26 performs the echo cancellation processing for a plurality of, for example, six microphones.

Since the EC 26 is realized with one DSP housing a memory, actually, it is performed a program processing in the DSP. However, in FIG. 19, the internal configuration is illustrated for a convenient or functional purpose as it is composed of an echo cancellation (EC) processing portion 261, a memory portion 263 and a control processing portion in the EC 264.

The EC processing portion 261 performs an echo cancellation processing for a sound signal of the microphone inputted to the EC 26 by selected in the first DSP 25 performing a microphone selection processing and so on, and a signal after the processing is sent to the sound pickup apparatus of the other party via a D/A converter 281 and a line out terminal.

The memory portion 263 stores data such as an echo cancellation use parameter used in the EC processing portion 261.

The a control processing portion in the EC 264 performs a control processing in the EC 26 such as, particularly, a timing control of the control processing in the EC processing portion 261 by cooperating with the first DSP 25.

Figure 20:
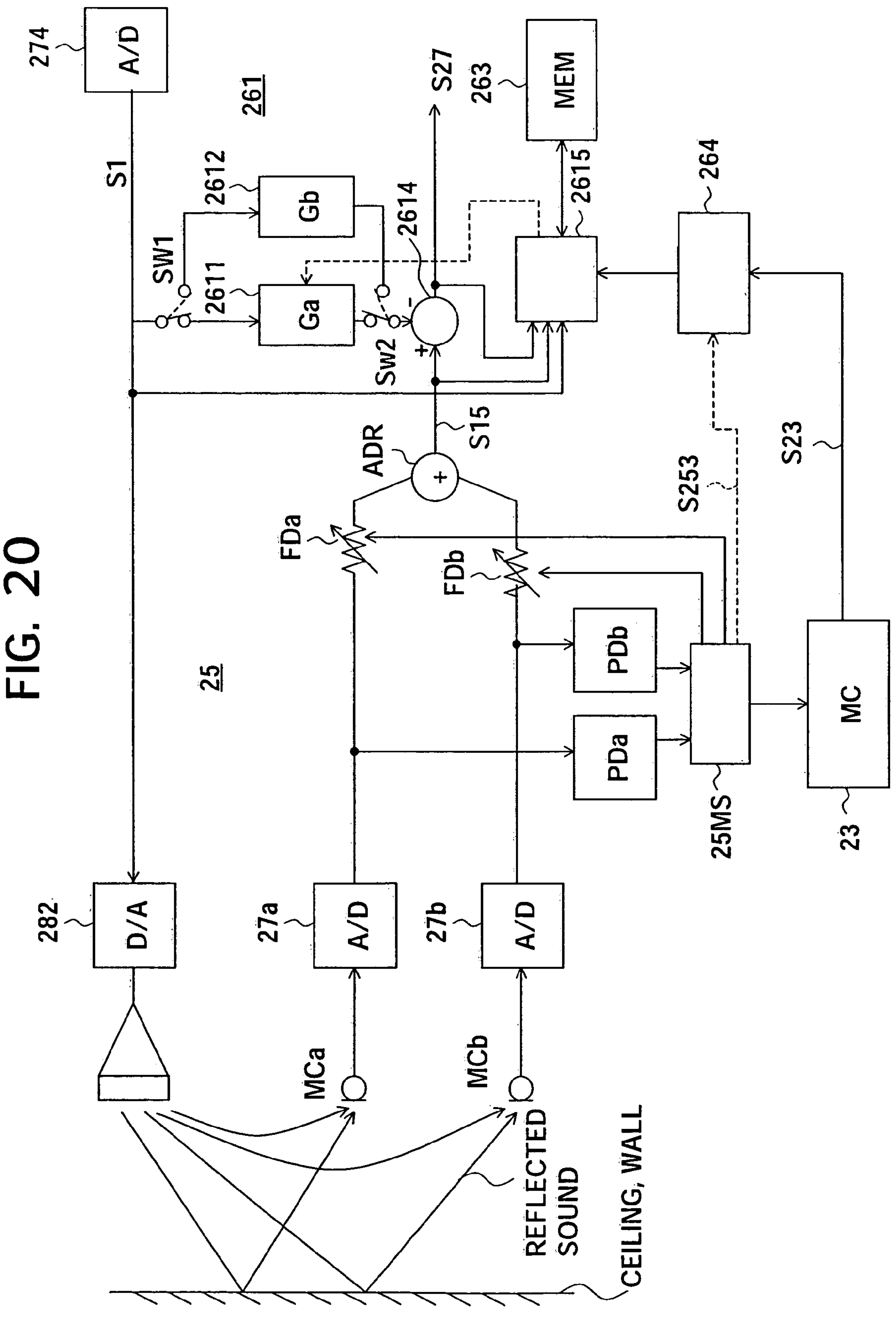
FIG. 20 is a block diagram showing a brief of a microphone selection processing in the first DSP in the sound pickup apparatus illustrated in FIG. 19 and an echo cancellation processing in the first DSP.

FIG. 20 is a block diagram showing a brief of a microphone selection processing in the first DSP 25 in the sound pickup apparatus illustrated in FIG. 19 and an echo cancellation processing in the EC 26.

An exemplification illustrated in FIG. 20 simplifies and exemplifies the case of selecting either one of two microphones MCa and MCb among six microphones illustrated in FIG. 4 in the first DSP 25. Hereinafter, a brief of processing of the first DSP 25 will be described.

The output of two microphones MCa and MCb is inputted to the first DSP 25 via two A/D converters 27*a* and 27*b* among the A/D converters 27 illustrated in FIG. 5 and a peak is detected at peak detection portions PDa and PDb in the first DSP 25. The microphone selection processing portion 25MS in the first DSP 25 selects, for example, the one having higher peak value. As a switching method from one microphone of the microphone selection processing portion 25MS to the other microphone, it is preferable to switch it by cross-fading as illustrated in FIG. 18. Therefore, the microphone selection processing portion 25 changes values of faders FDa and FDb set in the output side of the A/D converters 27*a* and 27*b* mutually and in a crossed state.

The sound output of two microphones MCa and MCb cross-faded via the faders FDa and FDb is added by an adder ADR and outputted to the EC 26.

A brief of the switching method from one of two microphones MCa and MCb to the other with cross-fading in the first DSP 25 has been explained, however, details of selecting method of microphones and switching method is based on the above-mentioned method of the first embodiment.

A brief of the processing of the EC processing portion 261 is shown in FIG. 20.

The EC processing portion 261 has a first switch SW1, a second switch SW2, a first and a second transmission characteristic processing portion 2611 and 2612, an adder-subtracter portion 2614 and a learning processing portion 2615.

The first switch SW1 connects either one of off-switch, the first and the second transmission characteristic processing portions 2611 and 2612 with an output signal S1 of the A/D converter 274 by the control processing portion in the EC.

The transmission characteristic processing portions 2611 and 2612 are portions generating echo cancellation components for signals of the microphones MCa and MCb respectively. The both sides have the same transmission characteristic function and have a delay element and a filter coefficient different according to the microphones MCa and MCb. The transmission characteristic function, delay element and filter coefficient are described later.

The second switch SW2 is also switched by the control processing portion in the EC 264, and the second switch SW2 connects either of the first and the second transmission characteristic processing portion 2611 and 2612 to the adder-subtracter portion 2614.

Either output of connected transmission characteristic processing portions 2611 and 2612 selected by the second switch SW2 is subtracted from a signal S25 from the adder ADR of the first DSP 25 as an echo cancellation component in the adder-subtracter portion 2614.

The echo component is estimated in the learning processing portion 2615, the delay element and the filter coefficient according to the estimated echo component are stored (updated) in the memory portion 263 and set to either of the transmission characteristic processing portions 2611 and 2612 corresponding to either of the microphones MCa and MCb.

In the present embodiment, the delay element and the filter coefficient generated by learning about the echo component by the learning processing portion 2615 are called as echo cancellation use parameters.

The echo cancellation processing in the EC processing portion 261 is an equalization filter processing regarding the delay element. The delay element is prescribed as average delay time until a microphone signal transmitted from the sound pickup apparatus of the other party is reflected by a wall, a ceiling and so on and detected by a microphone of this side, and further it reaches to the EC 26. Then, an echo signal component of amplitude that should be removed is prescribed by a filter coefficient of an equalization filter.

The transmission characteristic processing portions 2611 and 2612 are prescribed as equalization filters prescribed by a transmission function of the same configuration, however, the delay element and the filter coefficient are different by the microphones MCa and MCb. The delay element and the filter coefficient for each microphone are stored in the memory portion 263 by the learning processing portion 2615.

The learning processing portion 2615 has the transmission characteristic function equal to the transmission characteristic processing portions 2611 and 2612, inputs the output signal S1 of the A/D converter 274 showing a microphone selection signal of the sound pickup apparatus of the other party, an output signal S25 of the adder ADR in the first DSP 25 and an echo cancellation processing result signal S27 of the adder-subtracter portion 2614 continuously, learns, processes and estimates a characteristic so that an echo signal according to the microphone selection signal of the sound pickup apparatus of the other party (such as a reflection signal of the speaker 16) is removed and estimates the delay element and the filter coefficient, namely, the echo cancellation use parameters.

The delay element and the filter coefficient obtained by estimating in the learning processing portion 2615 are stored in the memory portion 263, configure either of the transmission characteristic processing portions 2611 and 2612 connected to the adder-subtracter portion 2614 by the switches SW1 and SW2 and equalize the output signal S1 of the A/D converter 274 in either of the transmission characteristic processing portions 2611 and 2612.

An echo cancellation signal S26 is outputted to a D/A converter 281, where the echo cancellation signal S26 is a signal that the equalization signal obtained by the above-mentioned method is applied to the adder-subtracter portion 2614 and subtracted from the signal S25 in the adder-subtracter portion 2614 and echo signals (such as the reflection signal of the speaker 16) according to the microphone selection signal of the sound pickup apparatus of the other party are deleted.

In the second embodiment, the echo cancellation processing is performed about the sound signal from one microphone selected among a plurality of, for example, two microphones MCa and MCb in the exemplification illustrated in FIG. 20, by one EC 26, in other words, by one EC processing portion 261.

When one of two microphones MCa and MCb is switched to the other of the two microphones, the switching signal is reported from the control portion 25MS in the first DSP 25 or from the a micro processor 23 performing a whole control of the sound pickup apparatus via the control portion 25MS to the control processing portion in the EC 264. However, if the control processing portion in the EC 264 activates the switches SW1 and SW2 so that the transmission characteristic processing portions 2611 and 2612 corresponding to the selected microphone are connected to the adder-subtracter portion 2614 and if the learning processing portion 2615 switches to the microphone that the delay element and the filter coefficient stored in the memory 23 are switched, the echo cancellation processing goes wrong. Because, since there is time lag between the signal S1 outputted from the A/D converter 274 and the echo such as a reflected sound outputted from the speaker 16 and detected by the microphones MCa and MCb, if switching a target of the echo cancellation processing immediately, the echo cancellation processing will be performed about the signal of the microphones MCa and MCb switched by the echo cancellation processing signal about the microphones MCa and MCb selected previously.

Figure 21:
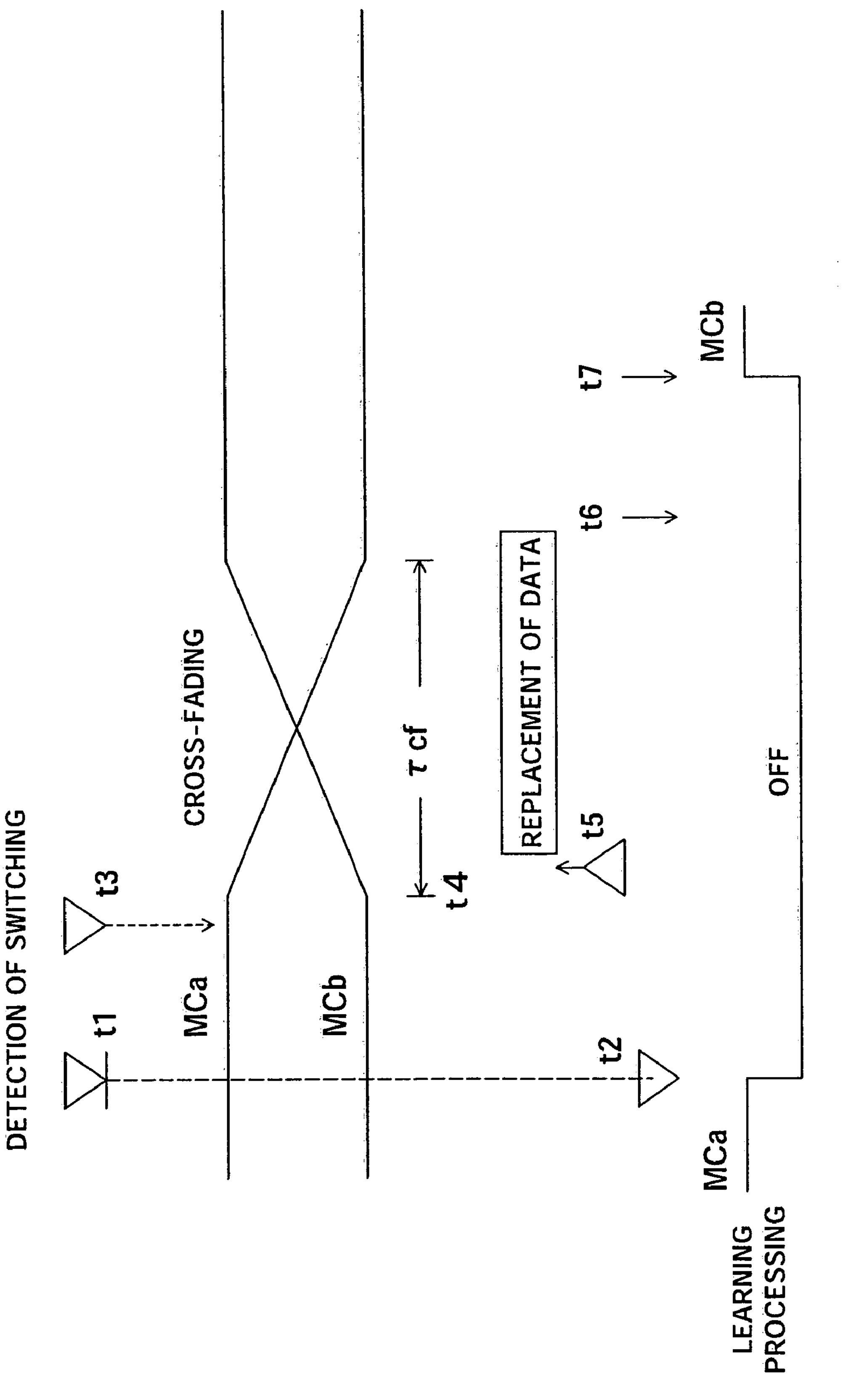
FIG. 21 is a view illustrated an example of operation timing of the echo cancellation processing.

Then, in the second embodiment of the present invention, the switching of the echo cancellation processing will be performed by a method exemplified in FIG. 21.

FIG. 21 is a view illustrated operation timing of the echo cancellation processing.

Hereinafter, the case of performing switching from the first microphone MCa to the second microphone MCb (selection change) will be exemplified.

At the time point t1, when the switching from the first microphone MCa to the second microphone MCb is detected, that detected signal is reported from the control portion 25MS of the first DSP 25 via the microprocessor for whole control 23 or from the control portion 25MS in the first DSP 25 directly to the control processing portion in the EC 264. Hereinafter, the case of being reported from the control portion 25MD to the control processing portion in the EC 264 directly will be described.

At the time point t2 almost same or a little late as the time point t1, the control processing portion in the EC 264 orders the learning processing portion 2615 of the EC processing portion 261 to stop its operation. At the same time, the control processing portion in the EC 264 turns off the switches SW1 and SW2 and disconnects between the transmission characteristic processing portions 2611, 2612 and the adder-subtracter portion 2614. Herewith, the echo cancellation becomes off-state, that is, the echo cancellation processing is not performed in the adder-subtracter portion 2614.

At the time point t3, the control portion 25MS in the first DSP 25 makes the microphones MCa and MCb to cross-fade as described in reference to FIG. 18. From the time point t4, the cross-fading begins.

Cross-fading time Tcf is tens of milliseconds usually, for example, about 10 milliseconds to 80 milliseconds.

At the time point t5, the control processing portion in the EC 264 reported a beginning of the cross-fading from the control portion 25MS at the time point t3 or t4 orders the learning processing portion 2615 to read out the delay element and the filter coefficient about the microphone MCb from the memory portion 263 and to set it to the switched transmission characteristic processing portion 2612. The learning processing portion 2615 learns the microphone MCb to be a target of a new echo cancellation processing, reads out the delay element and the filter coefficient for the microphone MCb from the memory portion 263 and set it to the corresponding transmission characteristic processing portion 2612.

At the time point t6, the control processing portion in the EC 264 reported finishing of cross-fading from the control portion 25MS activates the switch SW1 so that the output signal S1 of the A/D converter 274 is inputted to the transmission characteristic processing portion 2612 corresponding to the selected microphone MCb. Herewith, an echo cancellation component is calculated by using the delay element and the filter coefficient (echo cancellation use parameter) obtained beforehand and stored in the memory portion 263 in the selected transmission characteristic processing portion 2612. However, since the switch SW2 is still off in this state, the output of the transmission characteristic processing portion 2612 is not applied to the adder-subtracter portion 2614.

When assuming an output signal of the selected transmission characteristic processing portion 2612 is inputted, and the output signal is applied to the adder-subtracter portion 2614 and the echo cancellation processing is performed, the learning processing portion 2615 checks whether it reaches a state of being performed the echo cancellation processing well or not.

The learning processing portion 2615 performs the above-mentioned check continuously. When it judges that the selected microphone MCb reaches to a state able to perform the echo cancellation processing adequately or at a certain degree, the learning processing portion 2615 begins the echo cancellation processing by applying the output signal of the transmission characteristic processing portion 2612 corresponding to the selected microphone MCb.

Alternatively, without performing the above-mentioned check by the learning processing portion 2615, time between the time point t6 and t7 is defined as echo time set beforehand, and after elapsing predetermined time from the time point t6, the above-mentioned echo cancellation processing may be restart at the time point t7.

Afterward, the echo cancellation component calculated in the transmission characteristic processing portion 2612 in the adder-subtracter portion 2614 about the microphone MCb is reduced.

The learning processing portion 2615 estimates the echo cancellation component such that the sound signal from the sound pickup apparatus from the other party is removed in the output of the adder-subtracter 2614, learns the delay element and the filter coefficient for that, stores in the memory portion 263 and set them to the transmission characteristic processing portion 2612.

Therefore, even if switching from the first microphone MCa to the second microphone MCb is performed, it can be prevented to arise an unnatural echo cancellation processing.

The echo cancellation processing in the EC processing portion 261 are exemplifications. For example, the transmission characteristic function in the transmission characteristic processing portions 2611 and 2612 and the learning processing in the learning processing portion 2615. The other echo cancellation processing can be performed.

In the second embodiment, an unnatural echo cancellation processing can be prevented by keeping the echo cancellation processing in an off state for predetermined time about an echo component having time constant or delay element.

Although the above-mentioned second embodiment describes the case of performing cross-fading, when not performing cross-fading, it has only to be performed without considering cross-fading period.

Although, about the above-mentioned processing in the second DSP (echo canceller) 26, the case of performing with the EC 26 having the components exemplified in FIG. 20, in the embodiment of the present invention, components in the DSP 26 are not limited particularly, and the above-mentioned echo cancellation processing has only to be performed in the EC 26.

The second embodiment is particularly effective in the case of performing an echo cancellation processing by using one EC 26 (EC processing portion 261) for sound signals of a plurality of microphones.

Further, in the above-mentioned second embodiment, although it is described about the case that the delay element and the filter coefficient is set in the transmission characteristic processing portions 2611 and 2612 by using the learning processing portion 2615 and estimating the echo cancellation processing component full-time, a method without using the learning processing portion 2615 can be used.

For example, when placing the sound pickup apparatus, a transmission characteristic function is obtained for each microphone, a delay element and a filter coefficient are obtained for each microphone, they are stored in the memory portion 263 and they are used as fixed values. That is, when switching microphones, at the above-mentioned timing, for example, the control processing portion in the EC 264 sets to the transmission characteristic processing portion 2611 and 2612. According to such a method, the learning processing portion 2615 becomes unnecessary, since it is not necessary to learn and to process in the learning processing portion 2615 sequentially and to estimate echo cancellation processing components, the processing of the second DSP (echo canceller) 26 is reduced.

Third Embodiment

A third embodiment of a sound pickup apparatus and an echo cancellation processing method of the present invention will be described with reference to FIG. 22 and FIG. 23.

As described as the second embodiment, an echo cancellation processing about each microphone is performed by the EC 26. Namely, the EC 26 suppresses an echo and an acoustic feedback by subtracting a signal entering from a speaker (an acoustic coupling) from the microphone signal, and allows the two-way conference by the sound pickup apparatus. Note that, update processing of the echo cancellation use parameter by constant learning by the learning processing portion 2615 as described with reference to FIG. 20 is desirable since the acoustic coupling changes by an environment such as a room, a surrounding thing and people.

Meanwhile, in an initial state of the EC 26, such as the time that the sound pickup apparatus is arranged in a new environment, or the power supply of the sound pickup apparatus is turned on, learning of the learning processing portion 2615 in the EC 26 is not performed. Therefore, there is no adequate echo cancellation use parameter in the memory portion 263 in the EC 26 and there is a possibility of bringing an inadequate result by performing the echo cancellation processing with using such an echo cancellation use parameter. Namely, since, for example, an echo cancellation use parameter (a transfer coefficient and a filter coefficient) of the initial state or the echo cancellation use parameter used until the previous time is stored in the memory portion 263 of the EC 26, when performing the echo cancellation processing in the EC processing portion 261 with using such a echo cancellation use parameter, an unstable state in the echo cancellation processing such as acoustic feedback is occurred in a period until the learning processing portion 2615 learns and generates an echo cancellation use parameter based on a new environment in that environment.

It suffered from a disadvantage that the result that the echo cancellation processing is performed in such an unstable situation was sent to the sound pickup apparatus of the other party. Consequently, for avoiding an echo and acoustic feedback, for example, the sound has not been sent until the echo canceller learned enough at start of the sound pickup apparatus, or the sound has been sent with lowering the volume.

Further, since a sound sent from the sound pickup apparatus of the other party sounds the speaker 16 of the sound pickup apparatus of this side, the sound is detected how much degree the echo is by the microphone of this side, the EC 26 measures an acoustic coupling, and the EC 26 performs the echo cancellation processing based on the result, it suffered from a disadvantage that the learning processing of the learning processing portion 2615 in the EC 26 was not progressed and an adequate-echo cancellation use parameter may not be obtained when the sound is not sent from the sound pickup apparatus of the other party.

The above-mentioned disadvantage is occurred because it takes time from the sound is sent from the sound pickup apparatus of the other party until the learning processing portion 2615 learns and obtains an adequate echo cancellation use parameter.

Additionally, it suffers from a disadvantage that, even if an adequate echo cancellation use parameter about each microphone by learning at the learning processing portion, it takes time to obtain the echo cancellation use parameters for a plurality of microphones, in the present embodiment, six microphones and start time of the sound pickup apparatus is long.

The third embodiment improves the above-mentioned disadvantages.

Figure 22:
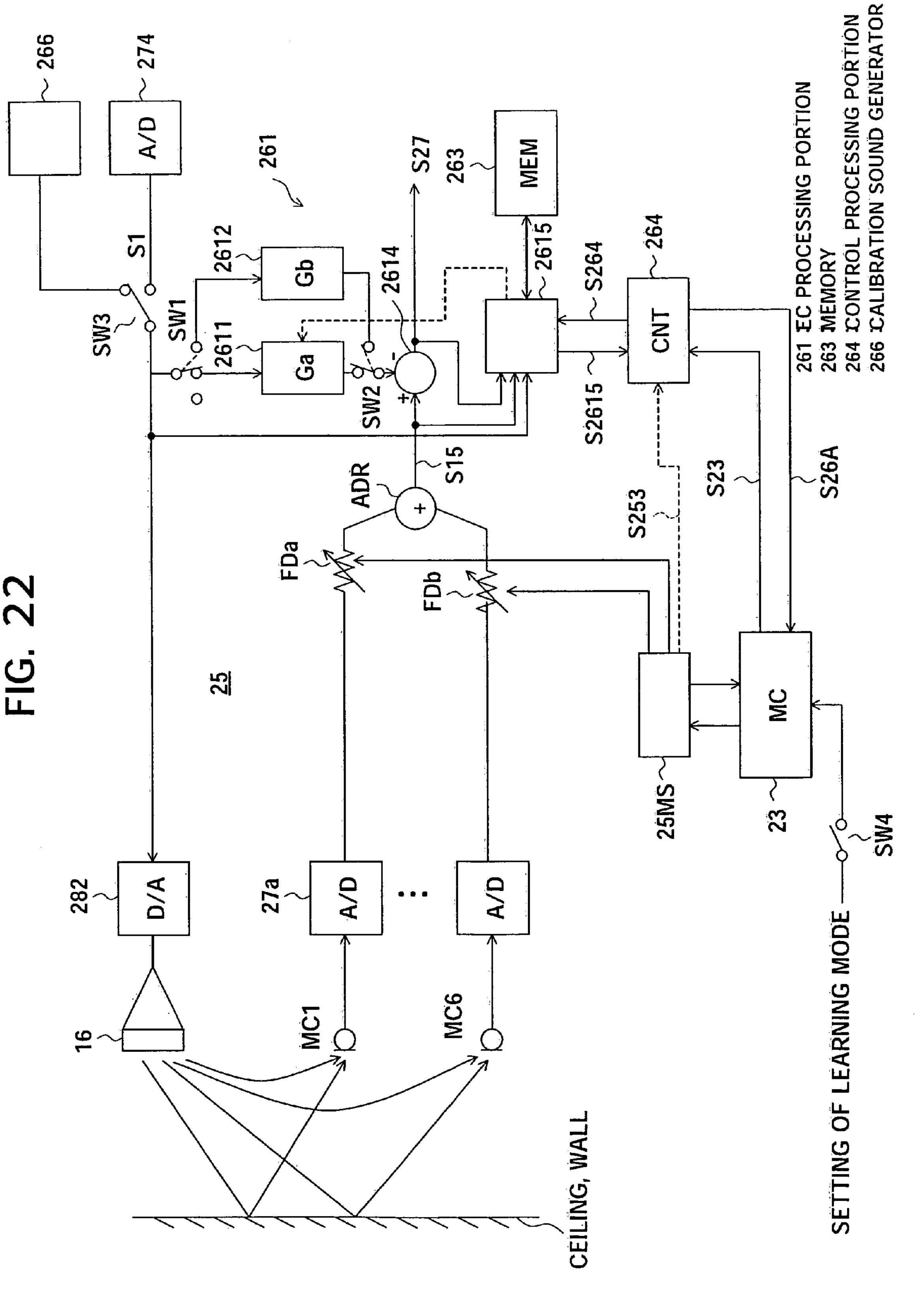
FIG. 22 is a view illustrating a brief configuration of a sound pickup apparatus of a third embodiment of the present invention.

FIG. 22 is a partial configuration of a sound pickup apparatus of the third embodiment. FIG. 22 is similar to the configuration illustrated in FIG. 20, however, an echo cancellation calibration sound generator 266 and a third and fourth switch SW3 and SW4 are added.

However, in the third embodiment, the selection of the microphone switches the microphone by direction from the control processing portion in the EC 264 to the microphone selection processing portion 25MS, as mentioned later, and the peak detection portions PDa and PDb in the first DSP 25 are not used, therefore, the peak detection portions PDa and PDb are not illustrated in FIG. 22.

Note that, for simplification the illustration, a configuration of two microphones is illustrated to exemplify in FIG. 22, as illustrated in FIG. 20, however, in the present embodiment, six microphones are used actually as illustrated FIG. 4, FIG. 5, and FIG. 19 and so on. Hereinafter, two microphones are exemplified and described.

The echo cancellation calibration sound generator 266 is an apparatus of emulating a sound sent from the sound pickup apparatus of the other party and generating a calibration sound for learning in the learning processing portion 2615 in the EC 26. The echo cancellation calibration sound generator 266 generates, for example, an audible sound having a frequency band described with reference to FIG. 10, for example a frequency band of 100 Hz to 7.5 kHz, and various types of amplitudes of a sound level as the calibration sound when driven by the control processing portion in the EC 264.

In the third embodiment, a "learning mode" is added for making the learning processing portion 2615 of the EC 26 learn and is set in the micro processor 23 via the fourth switch SW4.

Figure 23:
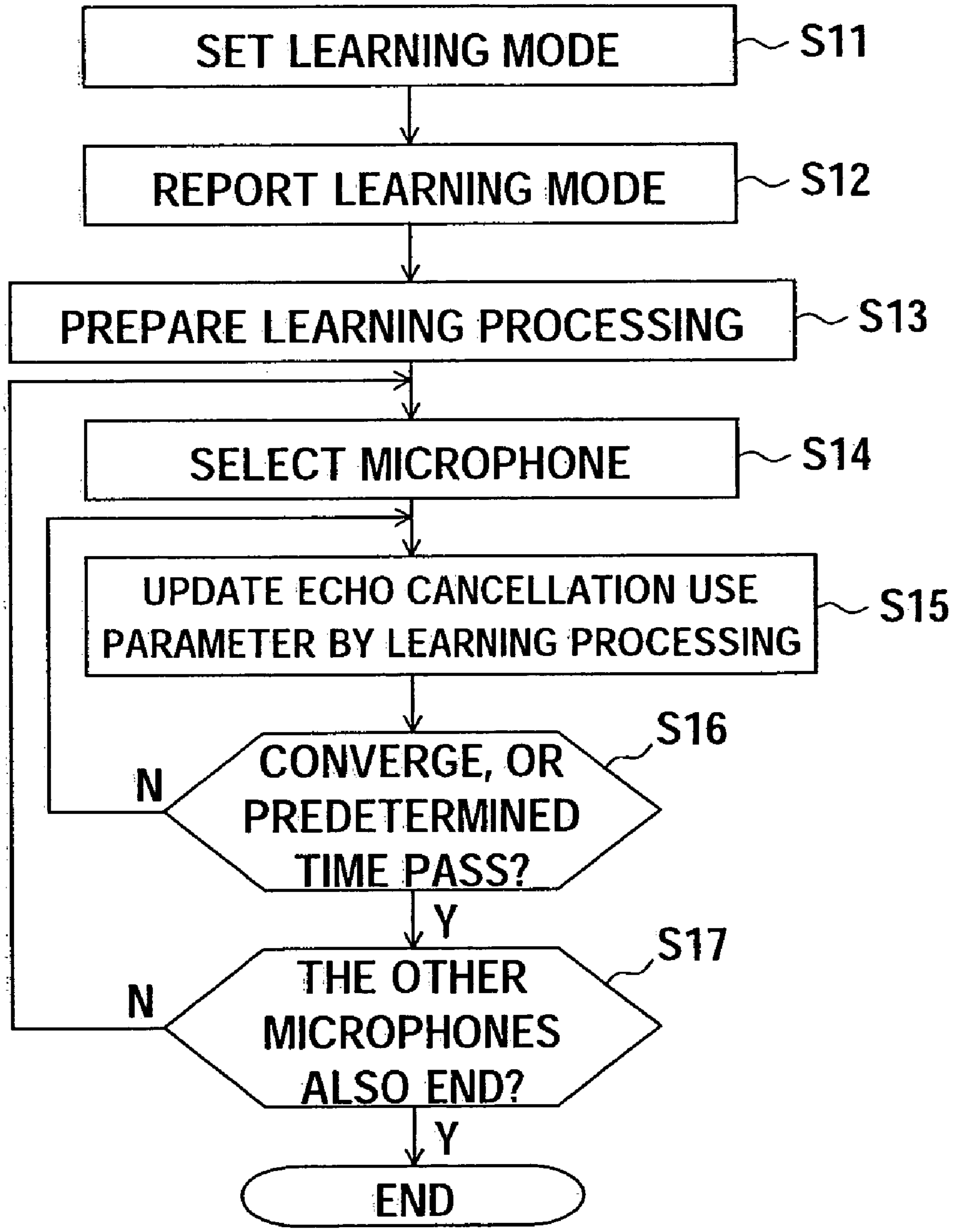
FIG. 23 is a flow chart showing an operation of a sound pickup apparatus of a third embodiment illustrated in FIG. 22.

FIG. 23 is a flow chart showing operation contents of the third embodiment. Hereinafter, operations of the third embodiment will be described.

{Step 11: Setting of the Learning Mode}

The micro processor 23 performs the following control for making the sound pickup apparatus perform the learning processing of the echo cancellation use parameter when the fourth switch is turned on and a learning mode setting signal is inputted.

{Step 12: Report of the Learning Model}

The micro processor 23 reports that the learning mode is set in the control processing portion in the EC 264.

{Step 13: Provision of the Learning Processing}

The control processing portion is the EC 264 reports that the learning mode is set in the learning processing portion 2615. Additionally, the control processing portion is the EC 264 drives the echo cancellation calibration sound generator 266, turns on the third switch as shown as a continuous line and interrupts a signal from the A/D converter 274. Further, the echo cancellation calibration sound signal from the echo cancellation calibration sound generator 266 is outputted from the speaker 16 via the D/A converter 282 and the signal from the echo cancellation calibration sound generator 266 is applied to the first switch SW1.

{Step 14: Selection of the Microphone}

The control processing portion in the EC 264 directs to select the first microphone to the micro processor 23 as a microphone selection signal S26A. Additionally, the control processing portion in the EC 264 sets the echo cancellation use parameter stored in the memory portion 263 into the first and the second transmission characteristic processing portion 2611 and 2612.

In the memory portion 263, for example, an echo cancellation use parameter set before shipment of the sound pickup apparatus, for example, a delay element showing a property of an echo cancellation use parameter corresponding to the first transmission characteristic processing portion 2611 and a filter coefficient is stored.

The micro processor 23 directs the microphone selection processing portion 25MS to have to select the microphone. To have to select the microphone is directed by the control processing portion in the EC 264. The microphone selection portion 25MS turns the first fader FDa and turns off the other fader, for example, FDb since the microphone selection processing portion 25MS.

{Step 15: Learning Processing}

The control processing portion in the EC 264 biases the first switch SW1 and the second switch SW2 and the first transmission property processing portion 2611 is connected between the third switch SW3 and the adder-subtracter portion 2614. As a result, the first transmission property processing portion 2611 starts filter processing of a predetermined time constant for an echo cancellation calibration sound from an echo cancellation use calibration sound generator 266 not including an echo.

On the other hand, a signal is converted to a digital signal in the A/D converter and inputted to the adder-subtracter portion 2614 of the EC 26 via the fader FDa and the adder portion ADR, where the signal is a signal that an echo that a sound corresponding to the echo cancellation calibration sound sent from the echo cancellation calibration sound generator 266 is reflected with a wall and a ceiling and so on is detected with the first microphone.

In the adder-subtracter portion 2614, a signal from the adder ADR is operated and processed in the first transmission property processing portion 2611 and the result is reduced.

The learning processing portion 2615 changes the echo cancellation use parameter of the first transmission property processing portion 2611 repeatedly so that the echo component included in the result of the adder-subtracter portion 2614 is canceled and disappeared, and stores it in the memory portion 263.

When judged that the result of the adder-subtracter portion 2614 is converged in a predetermined value, The learning processing portion 2615 outputs a signal indicating the learning processing to the control processing portion in the EC 264.

In this state, the echo cancellation use parameter for the first microphone of the memory portion 263 is set to a value of the converged state.

{Step 16: Compulsion Discontinuance}

Note that, when a desirable convergence result is not obtained even if predetermined time passes, the echo cancellation processing for the microphone is aborted.

In this case, the echo cancellation use parameter of an abortion line is saved in the memory portion 263.

{Step 17: Echo Cancellation Processing of the Other Microphones}

The processing of steps 14 to 16 are performed in similar to the above for the other microphones. As a rule, for the other microphones, the echo cancellation use parameter is stored in the memory portion 263.

Preferably, in an arrangement of the microphone exemplified in FIG. 4, in the counterclockwise order from the second microphone adjacent to the first microphone, the third microphone, to the sixth microphone, or in the clockwise order from the sixth microphone adjacent to the first microphone, fifth microphone, to the second microphone, and by using the echo cancellation use parameter obtained fort the previous microphone, the processing of the steps 14 and 15 is performed.

Because, since it is highly possible that the similar echo is inputted to the adjacent microphone, when the echo cancellation use parameter for the microphone obtained in previous is used, it is highly possible that the echo cancellation for the next microphone is converged in short time and the learning processing time can be shortened.

When using the echo cancellation use parameter obtained for the adjacent microphone as an initial value, and additionally switching the microphone for the learning processing for obtaining the echo cancellation use parameter for the previous microphone, the cross-fade method of the first embodiment described with reference to FIG. 18, or the second embodiment described with reference to FIG. 21 can be applied.

In updating the echo cancellation use parameter in the above-mentioned learning mode, the processing result is not sent to the sound pickup apparatus of the other party via the D/A converter 281.

As setting timing of the learning mode, for example, the fourth switch SW4 may be turned on at the time that the power supply is turned on, namely, when a power switch of the sound pickup apparatus is pushed. Note that, once an adequate echo cancellation use parameter for each microphone is obtained, it is not necessary of performing the learning processing every time that the power supply is turned on as long as an installation environment of the sound pickup apparatus does not change.

In such a case, when the echo cancellation use parameter is obtained for each microphone and stored in the memory portion 263 once, a flag showing the state is set in the memory portion 263. The micro processor 23 reads a state of the flag of the memory portion 263 soon after the power supply is turned on, and when the flag is set, the learning processing can be bypassed.

Further, a user of the sound pickup apparatus pushes the fourth switch SW4 and the learning mode can be set manually. In this case, the learning processing is performed at arbitrary timing by the user's hope and the echo cancellation use parameter of each microphone can be updated.

Note that, when performing the learning processing for an adjustment of the echo cancellation use parameter of the above each microphone, for example, the micro processor 23 can light an LED of a portion corresponding to the microphone that becomes the present target.

According to the third embodiment, since an adequate echo cancellation use parameter can be obtained for each microphone preliminarily, the best echo cancellation use parameter in response to an installation environment of the sound pickup apparatus can be obtained preliminarily, and by using the result, the sound pickup apparatus can become available quickly.

In particular, in the sound pickup apparatus having the speaker 16 and a plurality of microphones, it was necessary to learn the acoustic coupling level for the number of the microphones and it took time to start the apparatus. However, according to the third embodiment, the rise time at start disappears practically.

In the third embodiment, preferably, by using the echo cancellation use parameter for an adjacent and previous microphone, the echo cancellation use parameter is for a next microphone is performed the learning processing and obtained, therefore, the echo cancellation use parameters can be obtained for a plurality of microphones in short time.

Modified Mode of the Third Embodiment

As mentioned above, the case of obtaining the one echo cancellation use parameter for each microphone was described, however, a plurality of predetermined microphones may be used together as a form of use of the sound pickup apparatus. For example, two adjacent microphones may be used together.

For such a case, for example, by turning on a plurality of faders turning on a plurality of adjacent microphones, the generation (update) processing can be performed by the learning of the echo cancellation use parameter similar to the above for each of a plurality of microphones in a combination of the microphones Therefore, even in the case of using a plurality of microphones together, for example, an echo and acoustic feedback can be prevented.

Note that, the micro processor 23 and the control processing portion in the EC 264 correspond to an echo cancellation processing control section of the present invention, and the echo cancellation calibration sound generator 266 corresponds to an echo cancellation calibration sound generation section of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A sound pickup apparatus comprising:

a plurality of microphones arranged based on a predetermined arrangement condition;

a microphone selection section for selecting one or more of a plurality of the microphones;

an echo cancellation processing section for performing echo cancellation processing for each microphone for a sound signal detected by the selected microphone;

an echo cancellation calibration sound generation section;

a speaker outputting a calibration sound from the echo cancellation calibration sound generation section, and an echo cancellation processing control section for driving the echo cancellation calibration sound generation section to generate an echo cancellation calibration sound, excluding an echo, and to output the echo calibration sound from the speaker and selecting one or more of the plurality of microphones detecting sounds including the echo cancellation calibration sound outputted from the speaker via the microphone selection section in a learning mode of the echo cancellation processing section, and generating or updating an echo cancellation use parameter by learning for the selected microphone in the echo cancellation processing section, thereby obtaining the echo cancellation use parameter for preforming echo cancellation, wherein a flag indicating a state of the echo cancellation use parameter for each microphone of said plurality of microphones is read, and when the flag indicates that the echo cancellation use parameter for each of said plurality of microphones is obtained, the learning mode of the echo cancellation processing section is bypassed, and wherein the echo cancellation calibration sound is an audible sound having a predetermined frequency band and various types of amplitudes of a sound level.

2. A sound pickup apparatus as set forth in claim 1, wherein the learning mode is a mode set automatically when the power supply of the sound pickup apparatus is turned on.

3. A sound pickup apparatus as set forth in claim 1, wherein the learning mode is a mode set by a user of the sound pickup apparatus.

4. A sound pickup apparatus as set forth in claim 1, wherein the echo cancellation processing section comprises:

a memory section for storing the echo cancellation use parameter;

a transmission property processing section for performing transmission property processing of an echo component by using an echo cancellation use parameter for each microphone stored in the memory section;

an addition and subtraction section for subtracting a result operated in the transmission property processing section from a detection signal of the selected microphone, and a learning processing section for updating the echo cancellation use parameter based on a result of the operation of the addition and subtraction section.

5. A sound pickup apparatus as set forth in claim 4, wherein the learning processing section sets an echo cancellation use parameter obtained for an adjacent microphone stored in the memory section to the transmission property processing section when generating the echo cancellation use parameter for each of a plurality of the microphones with learning.

6. An echo cancellation processing method comprising the steps of:

generating an echo cancellation calibration sound, excluding an echo, via a speaker and detecting sounds including the calibration sound with a respective one of plural microphones in a learning mode of echo cancellation processing, wherein a flag indicating a state of an echo cancellation parameter use parameter for each of said plural microphones is read, and when the flag indicates that the echo cancellation use parameter for each of said plural microphones is obtained, the learning, mode of echo cancellation processing is bypassed, and wherein the echo cancellation calibration sound is an audible sound having a predetermined frequency band and various types of amplitudes of a sound level;

performing echo cancellation processing for the detected sound signal of the respective microphone to generate or update an echo cancellation use parameter for the microphone, and performing the echo cancellation processing by using the generated or updated echo cancellation use parameter after the learning mode.

7. An echo cancellation processing method as set forth in claim 6, wherein the learning mode is a mode set automatically when the power supply is turned on.

8. An echo cancellation processing method as set forth in claim 6, wherein the learning mode is a mode set by a user.

9. An echo cancellation processing method as set forth in claim 6, wherein in the echo cancellation processing step, the echo cancellation use parameter is stored in a memory, transmission property processing of an echo component is performed by using the echo cancellation use parameter for each microphone stored in the memory, a result operated in the transmission property is added and subtracted from a detected signal of the selected microphone, and the echo cancellation use parameter is updated based on a result of the addition and subtraction to perform learning processing.

10. An echo cancellation processing method as set forth in claim 9, wherein the echo cancellation use parameter obtained for an adjacent microphone stored in the memory is set in the transmission property processing when the echo cancellation use parameter for each of a plurality of the microphones by updating.

* * * * *